(12) United States Patent
Kuramitsu et al.

(10) Patent No.: US 11,302,988 B2
(45) Date of Patent: *Apr. 12, 2022

(54) BATTERY, BATTERY MODULE AND METHOD FOR PRODUCING SEPARATOR

(71) Applicant: Panasonic Intellectual Property Management Co., Ltd., Osaka (JP)

(72) Inventors: Kazuki Kuramitsu, Osaka (JP); Kazunari Hiraide, Osaka (JP); Tetsuji Omura, Osaka (JP); Akira Takano, Osaka (JP); Shigeaki Sakatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

This patent is subject to a terminal disclaimer.

(21) Appl. No.: 16/325,254

(22) PCT Filed: Sep. 20, 2017

(86) PCT No.: PCT/JP2017/033806
§ 371 (c)(1),
(2) Date: Feb. 13, 2019

(87) PCT Pub. No.: WO2018/061894
PCT Pub. Date: Apr. 5, 2018

(65) Prior Publication Data
US 2020/0058912 A1 Feb. 20, 2020

(30) Foreign Application Priority Data

Sep. 27, 2016 (JP) .............................. JP2016-188605
Sep. 27, 2016 (JP) .............................. JP2016-188606

(Continued)

(51) Int. Cl.
*H01M 50/24* (2021.01)
*H01M 50/20* (2021.01)
(Continued)

(52) U.S. Cl.
CPC ......... *H01M 50/24* (2021.01); *H01M 10/647* (2015.04); *H01M 10/658* (2015.04);
(Continued)

(58) Field of Classification Search
None
See application file for complete search history.

(56) References Cited

U.S. PATENT DOCUMENTS 10,923,787 B2 * 2/2021 Abe .................... D06M 11/79
2014/0193685 A1 * 7/2014 Lim .................... H01M 10/658
429/99

(Continued)

FOREIGN PATENT DOCUMENTS

CN 104752650 A 7/2015
CN 105390461 A 3/2016
(Continued)

OTHER PUBLICATIONS

International Search Report of PCT application No. PCT/JP2017/033806 dated Dec. 19, 2017.
(Continued)

*Primary Examiner* — Jonathan Crepeau
(74) *Attorney, Agent, or Firm* — McDermott Will & Emery LLP

(57) ABSTRACT

The battery module includes a plurality of batteries that are stacked and a heat transfer suppression member disposed between adjacent two batteries.

18 Claims, 21 Drawing Sheets

(30) Foreign Application Priority Data

Sep. 27, 2016 (JP) .............................. JP2016-188607
Sep. 27, 2016 (JP) .............................. JP2016-188608
Feb. 27, 2017 (JP) .............................. JP2017-035415

(51) Int. Cl.
  *H01M 50/403*  (2021.01)
  *H01M 10/658*  (2014.01)
  *H01M 10/647*  (2014.01)

(52) U.S. Cl.
  CPC ......... *H01M 50/20* (2021.01); *H01M 50/403* (2021.01); *H01M 2220/20* (2013.01)

(56) References Cited

U.S. PATENT DOCUMENTS

| | | | |
|---|---|---|---|
| 2015/0194641 A1 | 7/2015 | Tsuji et al. | |
| 2016/0060808 A1* | 3/2016 | Oikawa | D06M 13/513 |
| | | | 442/63 |
| 2016/0072104 A1* | 3/2016 | Yamafuku | H01M 50/20 |
| | | | 429/153 |
| 2016/0301048 A1 | 10/2016 | Zhao et al. | |
| 2019/0198951 A1* | 6/2019 | Tong | H01M 10/613 |

FOREIGN PATENT DOCUMENTS

| | | |
|---|---|---|
| CN | 107785511 A | 3/2018 |
| JP | 2004-362879 | 12/2004 |
| JP | 2012-181972 | 9/2012 |
| JP | 3191519 U | 6/2014 |
| WO | 2014/054633 | 4/2014 |

OTHER PUBLICATIONS

English Translation of Chinese Search Report dated Aug. 2, 2021 for the related Chinese Patent Application No. 201780050899.X.

* cited by examiner

BATTERY, BATTERY MODULE AND METHOD FOR PRODUCING SEPARATOR

CROSS-REFERENCE TO RELATED APPLICATIONS

This application is a U.S. national stage application of the PCT International Application No. PCT/JP2017/033806 filed on Sep. 20, 2017, which claims the benefit of foreign priority of Japanese patent application No. 2016-188608 filed on Sep. 27, 2016, Japanese patent application No. 2016-188607 filed on Sep. 27, 2016, Japanese patent application No. 2016-188606 filed on Sep. 27, 2016, Japanese patent application No. 2016-188605 filed on Sep. 27, 2016 and Japanese patent application No. 2017-035415 filed on Feb. 27, 2017, the contents all of which are incorporated herein by reference.

TECHNICAL FIELD

The present invention relates to a battery, a battery module, and a method for manufacturing a separator.

BACKGROUND ART

It is known that a battery module made up of a plurality of batteries connected in series serves as a power supply for vehicles or other uses that require high output voltage, for example. PTL 1 discloses a battery module having a structure in which a battery and a separator are alternately stacked. By disposing a separator between two adjacent batteries, the two batteries can be insulated from each other.

CITATION LIST

Patent Literature

PTL 1: Unexamined Japanese Patent Publication No. 2012-181972

SUMMARY OF THE INVENTION

The aforementioned battery module has a risk of occurrence of a cycle of overheat. Specifically, there is a possibility that a temperature of one battery rises excessively during use, the heat of the battery transmits to an adjacent battery, and a temperature of this adjacent battery also rises excessively. The cycle of overheat causes a marked decrease in performance of the battery module. As a result of diligent studies on the aforementioned battery module, the inventors of the present invention found that a conventional battery module has room for improvement in suppression of a decrease in performance of the battery module.

The present invention has been accomplished in light of this situation. It is an object of the present invention to provide a technique for suppressing a decrease in performance of a battery module.

One mode of a first aspect of the present invention is a battery module. The battery module includes a plurality of batteries that are stacked, a separator that is disposed between adjacent two batteries and insulates the two batteries from each other, and a heat transfer suppression member that is disposed between a battery and a separator adjacent to the battery.

One mode of a second aspect of the present invention is a method for manufacturing a separator. The method is a method for manufacturing a separator used for a battery module having a plurality of batteries that are stacked and includes integrally molding a base member that is made of a resin and includes a first part extending between two batteries in the assembled battery module and a heat transfer suppression member disposed in the first p art.

Another mode of the second aspect of the present invention is a battery module. The battery module includes a plurality of batteries that are stacked and a separator that is disposed between two adjacent batteries and insulates the two batteries from each other. The separator includes an integrally molded product obtained by integrally molding a base member that is made of a resin and includes a first part extending between the two batteries and a heat transfer suppression member disposed in the first part.

One mode of a third aspect of the present invention is a battery module. The battery module includes a plurality of batteries that are stacked, a separator that is disposed between adjacent two batteries and insulates the two batteries from each other, and a heat transfer suppression member that is disposed between adjacent two batteries. The separator has, in a region that overlaps the batteries when viewed from a direction in which the batteries are stacked, a through-hole that passes through the separator in the direction in which the batteries are stacked. At least part of the heat transfer suppression member is stored in the through-hole.

One mode of a fourth aspect of the present invention is a battery. The battery includes an exterior can, an insulating film that coats a surface of the exterior can, and a heat transfer suppression member disposed between the exterior can and the insulating film.

Another mode of the fourth aspect of the present invention is a battery module. The battery module includes the plurality of batteries that are stacked according to the above mode, and the heat transfer suppression member is disposed between adjacent two batteries.

One mode of a fifth aspect of the present invention is a battery. The battery includes a housing, an adhesive layer stacked on a surface of the housing, and a heat transfer suppression member fixed to the housing with the adhesive layer interposed therebetween.

Another mode of the fifth aspect of the present invention is a battery module. The battery module includes the plurality of batteries that are stacked according to the above mode, and the heat transfer suppression member is disposed between adjacent two batteries.

According to the present invention, it is possible to suppress a decrease in performance of a battery module.

DESCRIPTION OF EMBODIMENTS

Figure 1:
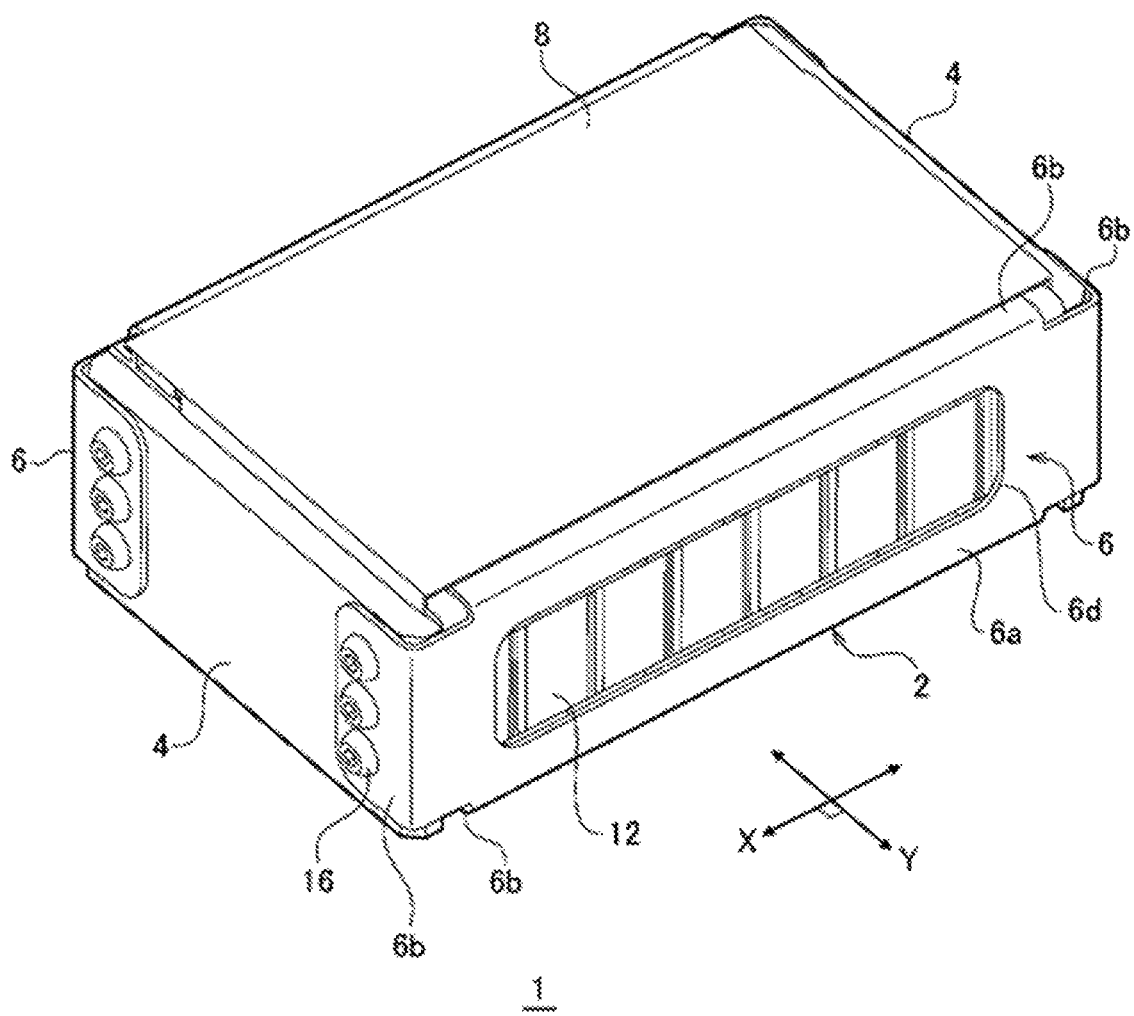
FIG. 1 is a schematic perspective view illustrating a structure of a battery module according to a first exemplary embodiment.

Hereinafter, the present invention will be described based on preferred exemplary embodiments with reference to the drawings. The exemplary embodiments are exemplifications and should not limit the invention. All the features described in the exemplary embodiments and a combination thereof are not necessarily essential to the invention. Identical reference marks are assigned to identical or equivalent components, members, processes illustrated in the drawings, and the repeated description thereof is omitted as appropriate. Further, scales or shapes of parts illustrated in the drawings are conveniently set to facilitate the description, and should not be interpreted restrictively unless otherwise mentioned. Even identical members may slightly differ from each other in scale or extent between the drawings. Additionally, the terms "first", "second", and the like used in the present description and claims should not represent any order or importance, but are intended to distinguish between one configuration and another configuration.

First Exemplary Embodiment

Figure 2:
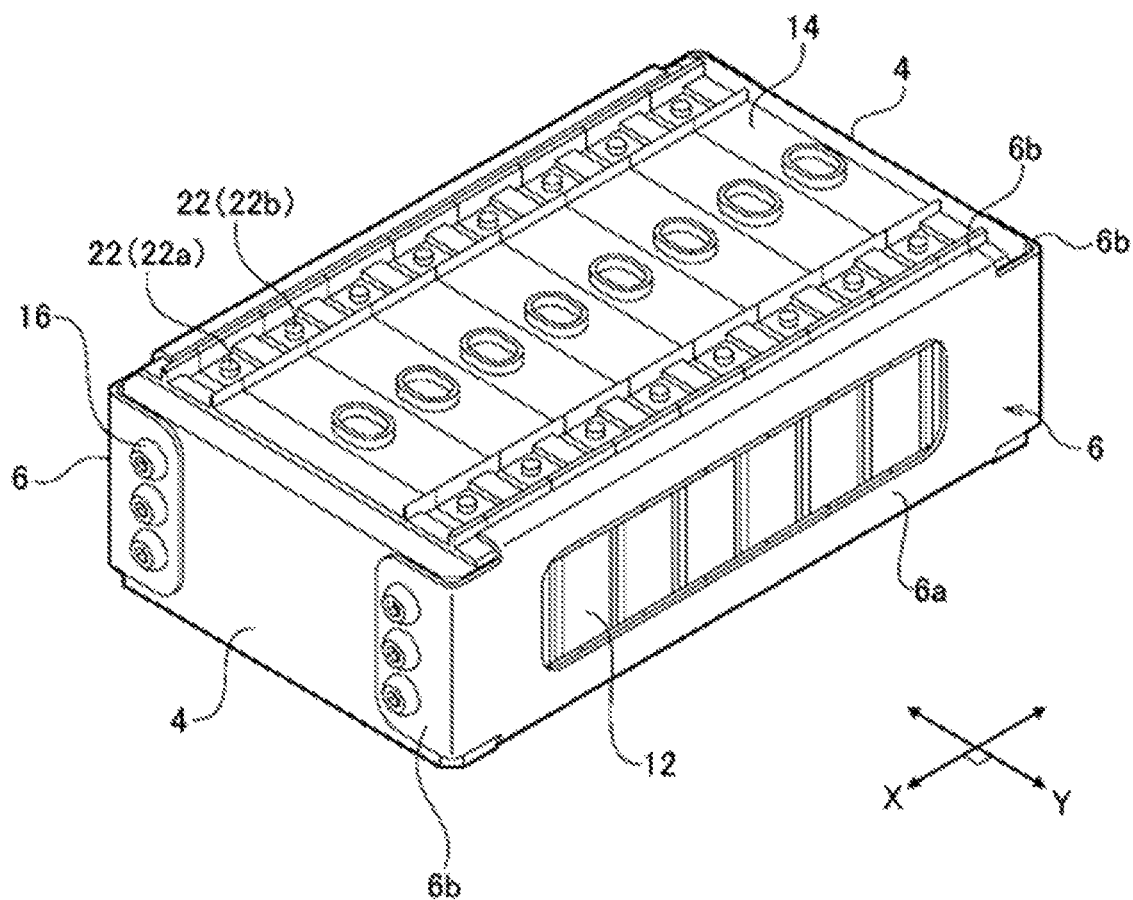
FIG. 2 is a schematic perspective view illustrating a structure of a battery assembly.

FIG. 1 is a schematic perspective view illustrating a structure of the battery module according to the first exemplary embodiment. FIG. 2 is a schematic perspective view illustrating a structure of a battery assembly. Battery module 1 includes battery assembly 2 and covering 8. Battery assembly 2 includes a plurality of batteries 12, a plurality of separators 14, a plurality of heat transfer suppression members 40, a pair of end plates 4, and a pair of restraint members 6. In the present exemplary embodiment, for example, eight batteries 12 are connected in series by bus bars (not illustrated), and thus battery assembly 2 is formed.

For example, each battery 12 is a rechargeable secondary battery, such as a lithium ion battery, a nickel-hydrogen battery, or a nickel-cadmium battery. Battery 12 is a so-called prismatic battery. The plurality of batteries 12 is stacked at predetermined intervals such that main surfaces of adjacent batteries 12 face each other. The "stack" herein denotes that a plurality of components is arranged in any one direction. Thus, the scope of "stacked batteries 12" includes cases in which the plurality of batteries 12 is arranged in a horizontal direction.

Two adjacent batteries 12 are arrayed such that positive-electrode output terminal 22 (positive electrode terminal 22a) of one battery 12 is adjacent to negative-electrode output terminal 22 (negative electrode terminal 22b) of other battery 12. Hereinafter, when there is no need to distinguish polarities of output terminal 22, positive electrode terminal 22a and negative electrode terminal 22b are collectively referred to as output terminal 22. Positive electrode terminal 22a and negative electrode terminal 22b that are adjacent to each other are electrically connected in series via a bus bar. The bus bar is a strip-shaped metal plate, for example. One end of the bus bar is electrically connected to positive electrode terminal 22a of one battery 12, and the other end of the bus bar is electrically connected to negative electrode terminal 22b of other battery 12.

Separator 14 is also called an insulating spacer and is formed of resin having an insulation property, for example. Separator 14 is disposed between two adjacent batteries 12 so that two adjacent batteries 12 are electrically insulated from each other. Furthermore, separator 14 is disposed between battery 12 and end plate 4 so that battery 12 and separator 4 are insulated from each other. Examples of a resin of which separator 14 is made include thermoplastic resins such as polypropylene (PP) and polybutylene terephthalate (PBT).

Heat transfer suppression member 40 is disposed between two adjacent batteries 12 so that heat transfer between two batteries 12 is suppressed. Heat transfer suppression member 40 has an insulating property. In the present exemplary embodiment, battery 12 includes heat transfer suppression member 40. A structure of battery 12 including heat transfer suppression member 40 will be described in detail later.

The plurality of batteries 12, the plurality of separators 14, and the plurality of heat transfer suppression members 40 that are stacked together are put between the pair of end plates 4. The pair of end plates 4 is disposed such that each end plate 4 is adjacent to outermost battery 12 with separator 14 interposed therebetween in stacking direction X in which batteries 12 are stacked (a direction indicated by arrow X in FIGS. 1 and 2). End plate 4 is made of a metal plate, for example, and is insulated from battery 12 since end plate 4 is adjacent to battery 12 with separator 14 interposed therebetween. A main surface of end plate 4 is provided with screw holes (not illustrated) into which fastening screws 16 are screwed.

The pair of restraint members 6 is arrayed in direction Y (a direction indicated by arrow Y in FIGS. 1 and 2) perpendicular to stacking direction X in which batteries 12 are stacked. An assemblage of the plurality of batteries 12, the plurality of separators 14, the plurality of heat transfer suppression members 40, and the pair of end plates 4 is disposed between the pair of restraint members 6. Restraint member 6 has rectangular plane 6a parallel to a side surface of the assemblage and eaves part 6b protruding from an end of each side of plane 6a toward the assemblage. Restraint member 6 can be formed by folding each side of a rectangular metal plate, for example. Through-holes (not illustrated) into which fastening screws 16 are inserted are provided at two eaves parts 6b facing each other in stacking direction X in which batteries 12 are stacked. Plane 6a is provided with opening 6d to expose the side surface of the assemblage. Preferably, opening 6d is disposed such that influence on rigidity of restraint member 6 against external force in stacking direction X in which batteries 12 are stacked is reduced to a minimum. This configuration allows restraint member 6 to come down in weight while maintaining rigidity. Restraint member 6 may be provided with a plurality of openings as needed.

Covering 8 is also called a top cover and is disposed so as to cover a surface of battery assembly 2 on which output terminals 22 project from batteries 12. Covering 8 is a plate-shaped component that has a shape corresponding in geometry with a shape of a top surface of battery assembly 2. In the present exemplary embodiment, covering 8 is rectangular in shape. Covering 8 prevents condensed water, dust, and other foreign matter from coming into contact with parts such as output terminals 22 of batteries 12, the bus bars, and valves 24 described later. Covering 8 is a component that constitutes a part of an outer shell of battery module 1. Covering 8 is made of a resin having an insulation property, for example. Examples of the resin forming covering 8 include thermoplastic resins such as polypropylene (PP) and polybutylene terephthalate (PBT). Covering 8 can be fixed to the top surface of battery assembly 2 by using a screw or a known fixing structure (not illustrated) including a known locking mechanism. Covering 8 may be structurally designed so as to be fixed to battery assembly 2 by clamping upper parts of separators 14 between both ends of covering 8.

Battery module 1 is assembled as follows, for example. Specifically, first, the plurality of batteries 12 each including heat transfer suppression member 40 are prepared. Next, the plurality of batteries 12 and the plurality of separators 14 are alternately arrayed, and these members are sandwiched by the pair of end plates 4. This forms an assemblage. Note that heat transfer suppression member 40 is not interposed between end plate 4 and battery 12 adjacent to this end plate 4. This can avoid hindrance of heat release from battery 12 through end plate 4.

Then, the pair of restraint members 6 is mounted on this assemblage. The assemblage partly enters a space surrounded by four eaves parts 6b of each restraint member 6. Each restraint member 6 is positioned such that the through-holes of the member overlap screw holes of end plate 4. In this state, fastening screws 16 are inserted into the through-holes and are screwed into the screw holes, respectively. As a result, the plurality of batteries 12 and the plurality of separators 14 are fastened by the pair of end plates 4 and the pair of restraint members 6.

The plurality of batteries 12 are fastened in stacking direction X by restraint members 6. This determines positions of the plurality of batteries 12 in stacking direction X. Furthermore, bottom surfaces of batteries 12 make contact with lower eaves part 6b of restraint member 6 with separators 14 interposed therebetween, and top surfaces of batteries 12 make contact with upper eaves part 6b of restraint member 6 with separators 14 interposed therebetween. This determines positions of the plurality of batteries 12 in a vertical direction. In this state, the bus bars are electrically connected to output terminals 22 of batteries 12 and thus battery assembly 2 is obtained. Subsequently, covering 8 is attached to the top surface of battery assembly 2. Battery module 1 is obtained through the above-described processes.

Figure 3:
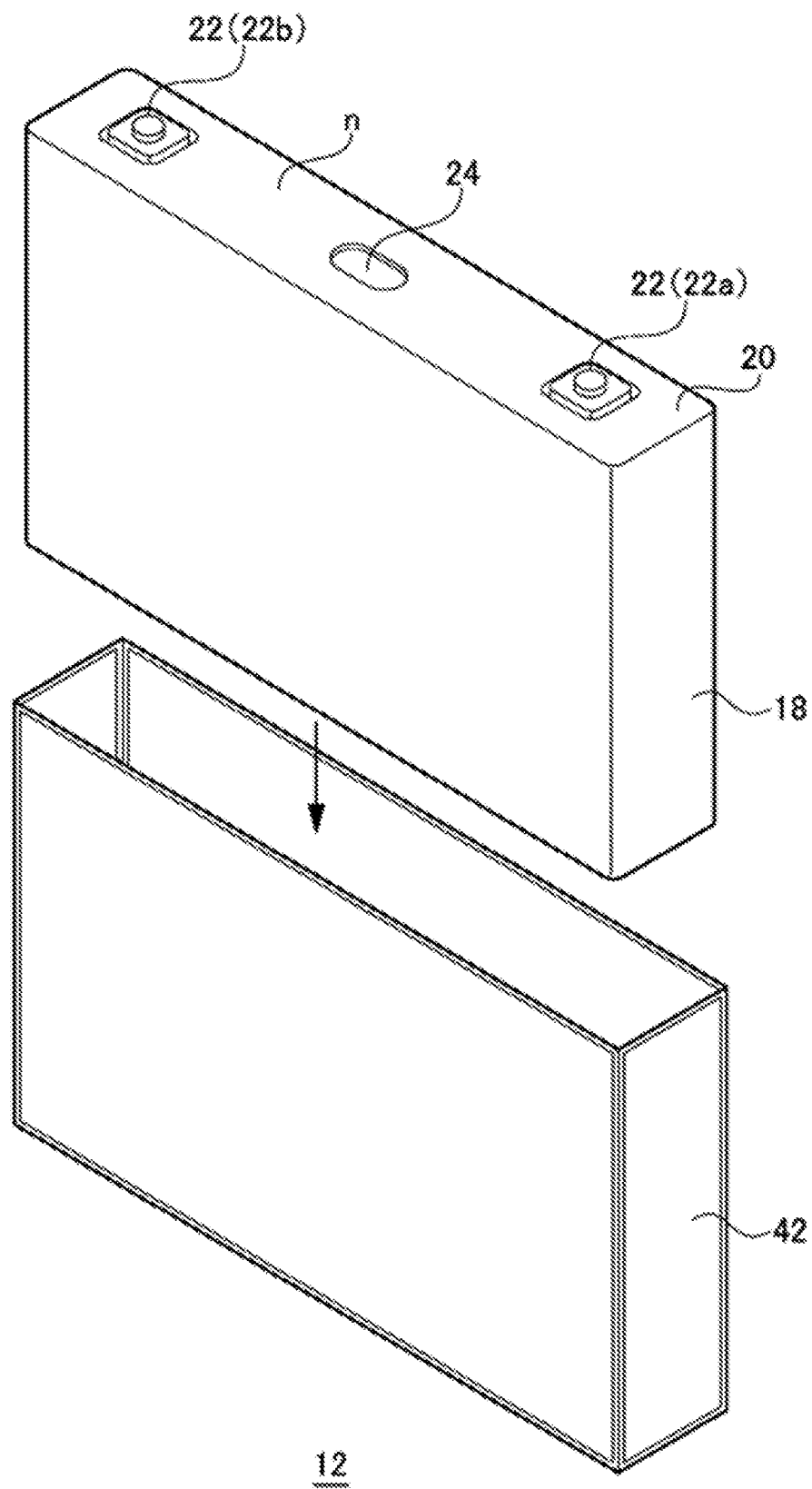
FIG. 3 is a schematic perspective view illustrating a structure of a battery according to first, second, and third aspects of the present invention.

In exemplary embodiments of first, second, and third aspects of the present invention, structures of battery 12 and separator 14, and a structure in which battery 12 and separator 14 are stacked are described in detail below with reference to FIG. 3. FIG. 3 is a schematic perspective view illustrating a structure of battery 12. Battery 12 has exterior can 18 with a flat rectangular parallelepiped shape. A substantially rectangular opening is provided on one surface of exterior can 18, and an electrode assembly, an electrolyte, and the like are put into exterior can 18 through this opening. The opening of exterior can 18 is provided with sealing plate 20 to seal an inside of exterior can 18. Sealing plate 20 has positive electrode terminal 22a near one end in a longitudinal direction and negative electrode terminal 22b near another end in the longitudinal direction. Sealing plate 20 and output terminals 22 constitute a sealing body. Exterior can 18 and sealing plate 20 are each formed from a metal. Typically, exterior can 18 and sealing plate 20 are each formed from a metal such as aluminum or an aluminum alloy. Output terminals 22 are each formed from a metal having electrical conductivity.

In the present exemplary embodiment, a side provided with the sealing body serves as top surface n of battery 12, and an opposite side serves as a bottom surface of battery 12. Further, battery 12 has two main surfaces connecting top surface n and the bottom surface. This main surface is a surface having a largest area among six surfaces of battery 12. Remaining two surfaces excluding top surface n, the bottom surface, and the two main surfaces serve as side surfaces of battery 12. A top surface n-side of batteries 12 serves as a top surface of battery assembly 2, and a bottom surface side of batteries 12 serves as a bottom surface of battery assembly 2.

Battery 12 has valve 24 on a surface to release gas generated inside battery 12. In the present exemplary embodiment, battery 12 has valve 24 on top surface n facing covering 8. Valve 24 is disposed between the pair of output terminals 22 of sealing plate 20. Specifically, valve 24 is disposed at a substantially central part of sealing plate 20 in the longitudinal direction. Valve 24 can be opened to release internal gas when internal pressure of exterior can 18 rises to a predetermined value or more. Valve 24 is also called a safety valve or a vent.

Furthermore, battery 12 has insulating film 42. Insulating film 42 is, for example, a shrink tube and is heated after exterior can 18 is stored in insulating film 42. As a result, insulating film 42 shrinks and coats a surface of exterior can 18. Short circuit between adjacent batteries 12 or between battery 12 and end plate 4 can be suppressed by insulating film 42.

The plurality of batteries 12 are disposed so that main surfaces of adjacent batteries 12 face each other and output terminals 22 face in the same direction (for convenience of description, upward in a vertical direction in this example). As described above, two adjacent batteries 12 are arrayed such that positive electrode terminal 22a of one battery 12 is adjacent to negative electrode terminal 22b of other battery 12. Two adjacent batteries 12 may be arrayed such that positive electrode terminal 22a of one battery 12 is adjacent to positive electrode terminal 22a of other battery 12. For example, if two adjacent batteries 12 are in parallel connection, batteries 12 are arrayed such that output terminals 22 of an identical polarity are adjacent to each other.

Figure 4:
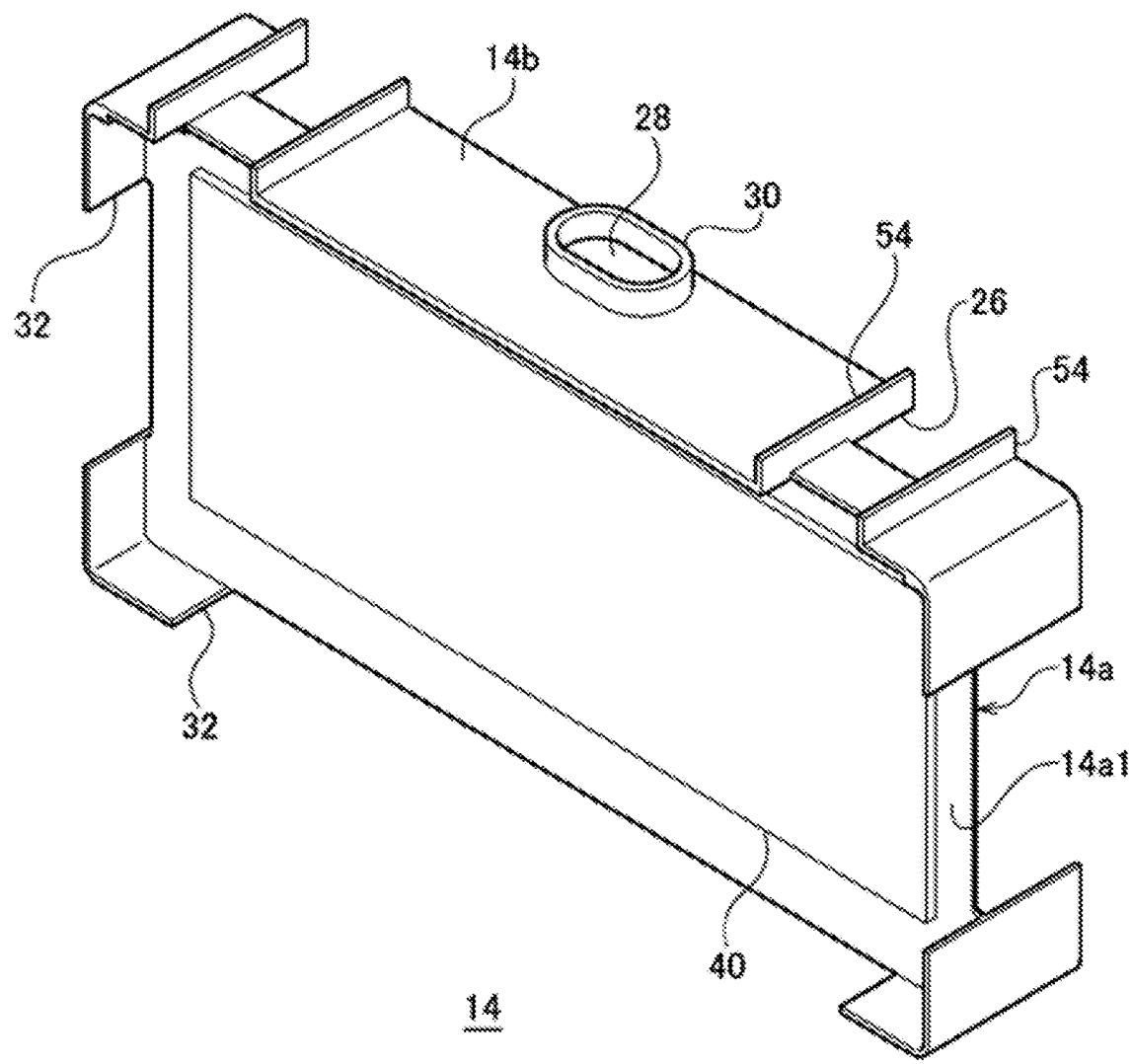
FIG. 4 is a schematic perspective view illustrating a structure of a separator and a heat transfer suppression member according to an exemplary embodiment of the first aspect of the present invention.
Figure 5:
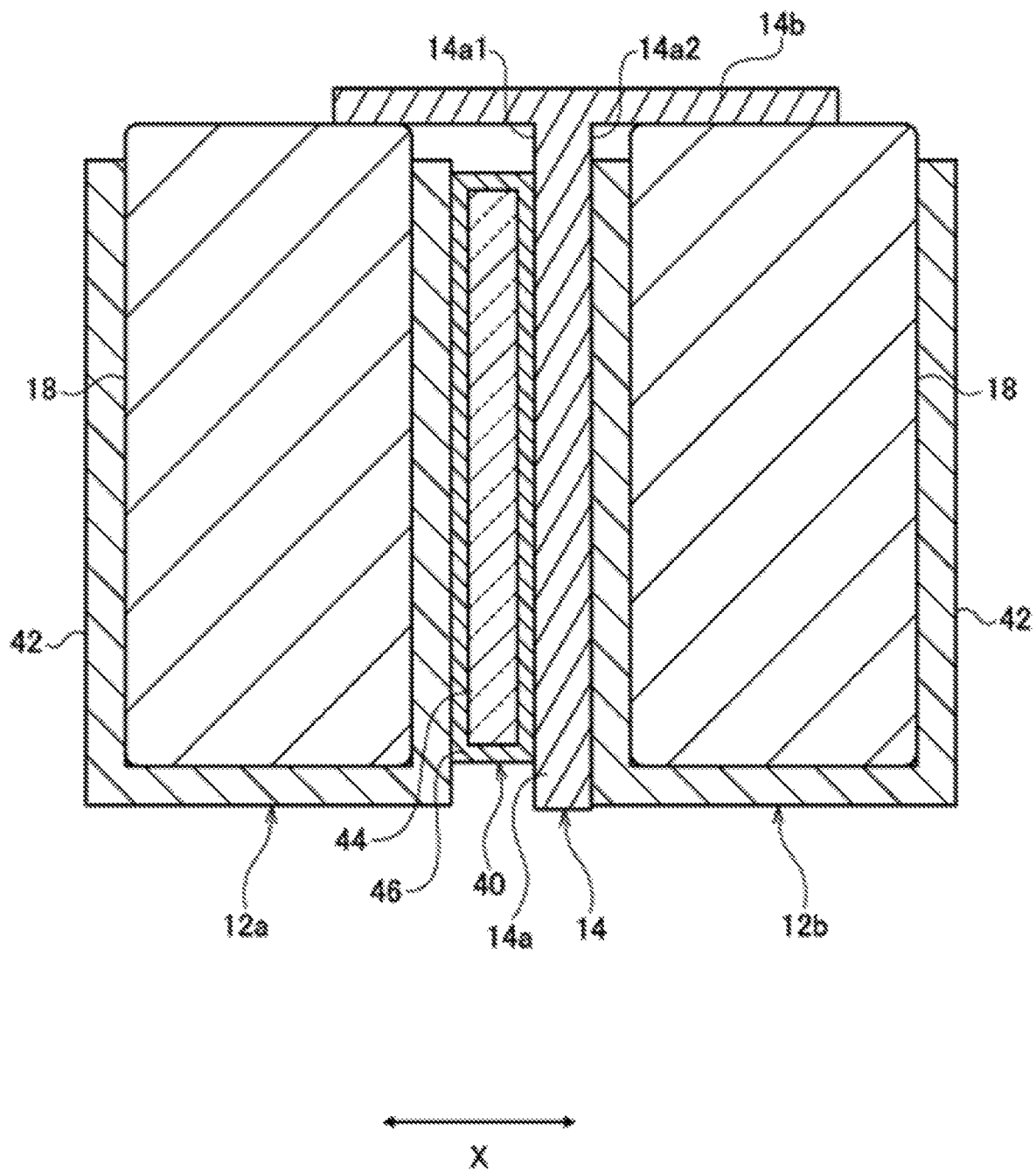
FIG. 5 is a cross-sectional view schematically illustrating a structure in which a battery, a separator, and a heat transfer suppression member are stacked according to an exemplary embodiment of the first aspect of the present invention.

FIG. 4 is a perspective view illustrating an outline structure of separator 14 and heat transfer suppression member 40 in the exemplary embodiment of the first aspect of the present invention. FIG. 5 is a cross-sectional view schematically illustrating a structure in which a battery, a separator, and a heat transfer suppression member are stacked. FIG. 5 illustrates any two batteries 12 (hereinafter referred to as battery 12a and battery 12b in a case where these two batteries 12 are distinguished from each other) and separator 14 and heat transfer suppression member 40 disposed between these two batteries 12. FIG. 5 illustrates a cross section extending in stacking direction X. In FIG. 5, illustration of an internal structure of battery 12 is omitted.

Separator 14 has plane 14a parallel to the main surface of battery 12 and wall 14b extending from an edge of plane 14a in stacking direction X in which batteries 12 are stacked. Plane 14a extends along opposing surfaces (main surfaces) of two adjacent batteries 12. Since plane 14a extends between the main surfaces of adjacent batteries 12, exterior cans 18 of adjacent batteries 12 are insulated from each other. Further, since plane 14a extends between battery 12 and end plate 4, exterior can 18 of battery 12 and end plate 4 are insulated from each other.

Top surface n, the bottom surface, and the side surfaces of battery 12 are covered with wall 14b. This can suppress a short circuit between adjacent batteries 12 or between battery 12 and end plate 4, which can be caused by, for example, dew condensation on a surface of battery 12 or end plate 4. In other words, a creepage distance between adjacent batteries 12 or between battery 12 and end plate 4 can be secured by wall 14b. In particular, wall 14b covers top surface n of battery 12, whereby the above-described short circuit can be further suppressed. In the present exemplary embodiment, a tip of wall 14b of one of two adjacent separators 14 abuts on a tip of wall 14b of other separator 14. Therefore, battery 12 is housed in a space formed by plane 14a and wall 14b. In the present exemplary embodiment, separator 14 holds battery 12 by way of wall 14b.

Wall 14b has cutout 26 at a position corresponding to output terminal 22 to expose output terminal 22 to the outside. Wall 14b also has opening 28 at a position corresponding to valve 24 to expose valve 24 to the outside. An edge of opening 28 is provided with barrier 30 projecting from a surface of wall 14b toward covering 8. Barrier 30 surrounds an entire periphery of opening 28. Wall 14b has cutout 32 at positions corresponding to the side surfaces and bottom surface of battery 12 to expose parts of the side surfaces and bottom surface of battery 12. A heatsink (not illustrated) is thermally connected to the side surfaces and/or the bottom surface of battery 12. Heat generated in battery 12 is released mainly through the heatsink. In assembled battery module 1, wall 14b is positioned between restraint member 6 and battery 12. This configuration prevents restraint member 6 and battery 12 from coming into contact with each other.

Separator 14 has support 54 projecting toward covering 8 and supporting covering 8 in assembled battery module 1. Support 54 is disposed on wall 14b covering top surface n of battery 12. In the present exemplary embodiment, a pair of supports 54 is disposed at both ends of cutout 26. Supports 54, which face each other through cutout 26 and are arrayed in direction Y perpendicular to stacking direction X, put a bus bar into an installation position. The bus bar is disposed between the pair of supports 54.

Heat transfer suppression member 40 is fixed to one main surface 14a1 of plane 14a of separator 14. Heat transfer suppression member 40 is disposed inside main surface 14a1 when viewed from a direction (stacking direction X) in which heat transfer suppression member 40 and separator 14 are aligned. Heat transfer suppression member 40 has a sheet shape and has heat insulating material 44 and laminate film 46. A thickness of heat transfer suppression member 40 is, for example, 1 mm to 2 mm.

Heat insulating material 44 has a sheet shape and has a structure such that a porous material, such as silica xerogel, having a void structure is held between fibers of a fiber sheet made of non-woven fabric or the like. Silica xerogel has a nano-size void structure that regulates movement of air molecules and has low heat conductivity. Heat conductivity of heat insulating material 44 is approximately 0.018 W/m·K to 0.024 W/m·K. Heat insulating material 44 is useful especially as a heat insulating material used in a narrow space. The heat conductivity of heat insulating material 44 is lower than heat conductivity of air. Accordingly, presence of heat transfer suppression member 40 provided in battery module 1 can keep heat conduction between batteries 12 smaller than a case where an air layer is provided as a heat insulating layer between batteries 12. Furthermore, the heat conductivity of heat transfer suppression member 40 is much lower than heat conductivity of separator 14.

Silica xerogel can stably maintain the structure against pressure from an outside. This makes it possible to stably maintain heat insulating performance of heat insulating material 44 irrespective of fastening in stacking direction X by restraint member 6. Accordingly, presence of heat transfer suppression member 40 provided in battery module 1 can more stably suppress heat conduction between batteries 12 than a case where an air layer is provided as a heat insulating layer between batteries 12. Furthermore, since heat insulating material 44 has lower heat conductivity than air, a similar heat insulating effect can be obtained with a thickness smaller than an air layer. It is therefore possible to suppress an increase in size of battery module 1.

Laminate film 46 is a member that wraps up whole heat insulating material 44 so as to protect heat insulating material 44. That is, the porous material and the fiber sheet are wrapped in laminate film 46. Laminate film 46 keeps the porous material in heat insulating material 44 from being detached from the fiber sheet. Furthermore, heat transfer suppression member 40 can be easily adhered to separator 14 since heat transfer suppression member 40 has a structure such that heat insulating material 44 is coated with laminate film 46. Laminate film 46 is, for example, made of polyethylene terephthalate (PET).

Heat transfer suppression member 40 has higher heat resistance than separator 14. More specifically, heat resistance of heat insulating material 44 is higher than heat resistance of separator 14. More specifically, the fiber sheet includes fibers that have a higher melting point than separator 14 and/or the porous material is made of a substance that has a higher melting point than separator 14. For example, heat insulating material 44 has a melting point of 300° C. or higher. Specifically, the fiber sheet and/or the porous material that constitute heat insulating material 44 have a melting point of 300° C. or higher. In particular, the fibers that constitute the fiber sheet preferably have a melting point of 300° C. or higher. This makes it possible to maintain a state where the porous material is held by the fiber sheet even in a case where heat insulating material 44 is exposed to a high temperature. As described above, by making the heat resistance of heat transfer suppression member 40 higher than the heat resistance of separator 14, it is possible to leave heat transfer suppression member 40 even in a case where separator 14 melts due to heat generated by batteries 12. Accordingly, insulation between batteries 12 can be maintained by heat transfer suppression member 40 even in a case where separator 14 melts. Furthermore, a state where heat transfer between adjacent batteries 12 is suppressed can be maintained for a longer period.

Heat transfer suppression member 40 is sandwiched between one battery 12a and plane 14a of separator 14 in assembled battery module 1. Accordingly, heat transfer suppression member 40 is disposed between two batteries 12. One main surface of heat transfer suppression member 40 is in contact with battery 12a. The other main surface of heat transfer suppression member 40 is in contact with one main surface 14a1 of plane 14a. Heat transfer suppression member 40 is not interposed between other main surface 14a2 of plane 14a and other battery 12b. Accordingly, main surface 14a2 of plane 14a and battery 12b are in contact with each other. Since heat transfer suppression member 40 is not provided between battery 12b and separator 14, i.e., since single heat transfer suppression member 40 is interposed between battery 12a and battery 12b, heat transfer between batteries 12a and 12b can be suppressed, and an increase in size of battery module 1 can be suppressed.

As described above, in the exemplary embodiment of the first aspect of the present invention, battery module 1 according to the present exemplary embodiment includes the plurality of batteries 12 that are stacked, separator 14 that is disposed between two adjacent batteries 12 so as to insulate two batteries 12 from each other, and heat transfer suppression member 40 disposed between battery 12 and separator 14. With this configuration, even in a case where a temperature of any battery 12 rises excessively during use of battery module 1, it is possible to keep heat of this battery 12 from transferring to adjacent battery 12. This makes it possible to suppress a cycle of overheat, thereby avoiding a decrease in performance of battery module 1. According to battery module 1 according to the present exemplary embodiment, a cycle of thermal runaway can be suppressed even in a case where thermal runaway of battery 12 occurs.

Heat transfer suppression member 40 has higher heat resistance than separator 14. This makes it possible to maintain insulation between batteries 12 even in a case where separator 14 melts due to heat generated by battery 12. Furthermore, heat transfer between batteries 12 can be suppressed for a longer period.

Second Exemplary Embodiment

Figure 6:
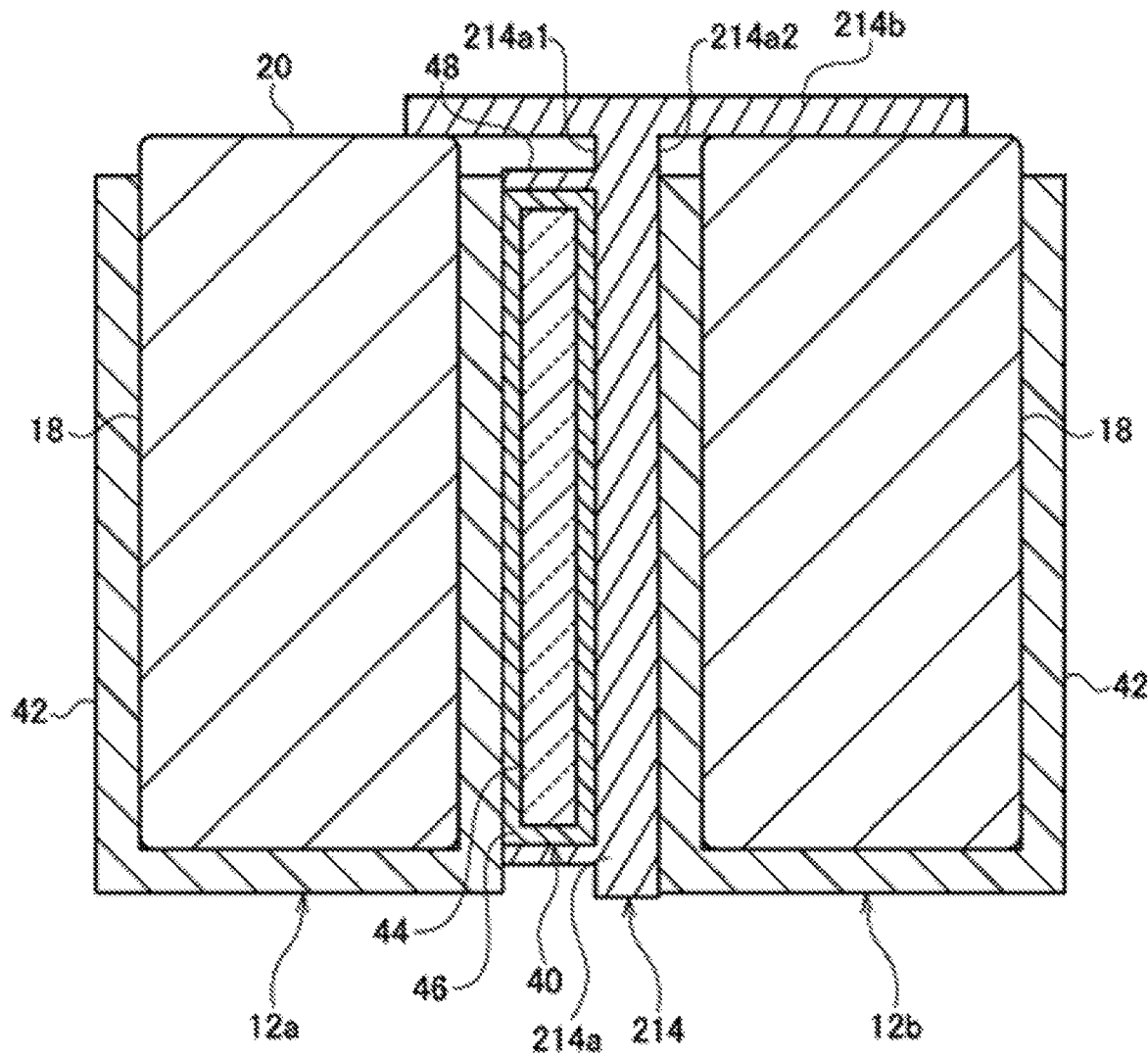
FIG. 6 is a cross-sectional view schematically illustrating a structure in which a battery, a separator, and a heat transfer suppression member in a battery module according to a second exemplary embodiment are stacked in an exemplary embodiment of the first aspect of the present invention.

In the exemplary embodiment of the first aspect of the present invention, a battery module according to a second exemplary embodiment shares a configuration with the battery module of the first exemplary embodiment except for a dissimilarity in separator shape. The following description of the battery module according to the present exemplary embodiment is primarily given on differences between the first and second exemplary embodiments, and redundant descriptions of shared elements are omitted or simplified. FIG. 6 is a cross-sectional view schematically illustrating a structure in which a battery, a separator, and a heat transfer suppression member in the battery module according to the second exemplary embodiment are stacked. FIG. 6 illustrates any two batteries 12 (hereinafter referred to as battery 12a and battery 12b in a case where these two batteries 12 are distinguished from each other) and separator 214 and heat transfer suppression member 40 disposed between these two batteries 12. FIG. 6 illustrates a cross section extending in stacking direction X. In FIG. 6, illustration of an internal structure of battery 12 is omitted.

Separator 214 provided in the battery module according to the present exemplary embodiment has a structure similar to separator 14 except for that separator 214 includes protrusion 48. Specifically, separator 214 has plane 214a and wall 214b. Heat transfer suppression member 40 is attached to one main surface 214a1 of plane 214a of separator 214. Heat transfer suppression member 40 is disposed inside main surface 214a1 when viewed from a direction (stacking direction X) in which heat transfer suppression member 40 and separator 14 are aligned. Heat transfer suppression member 40 has a sheet shape and has heat insulating material 44 and laminate film 46.

Furthermore, separator 214 has, on one main surface 214a1 of plane 214a, protrusion 48 that protrudes from main surface 214a1 toward heat transfer suppression member 40 side. Protrusion 48 is disposed on an outer side relative to heat transfer suppression member 40 when viewed from a direction in which heat transfer suppression member 40 and separator 214 are aligned. In the present exemplary embodiment, protrusion 48 is disposed so as to surround an entire outer periphery of heat transfer suppression member 40. At least part of heat transfer suppression member 40 is fitted into a space surrounded by protrusion 48. Heat transfer suppression member 40 is supported by protrusion 48 in this state. Protrusion 48 may be provided intermittently along the outer periphery of heat transfer suppression member 40.

Heat transfer suppression member 40 is sandwiched between battery 12a and plane 214a of separator 214 in assembled battery module 1. A front end of protrusion 48 is in contact with one battery 12a. Accordingly, heat transfer suppression member 40 is stored in a space surrounded by battery 12a, plane 214a, and protrusion 48.

One main surface of heat transfer suppression member 40 is in contact with battery 12a. The other main surface of heat transfer suppression member 40 is in contact with one main surface 214a1 of plane 214a. A side surface connecting two main surfaces of heat transfer suppression member 40 is in contact with protrusion 48. Preferably, a protruding height of protrusion 48 is set smaller than a thickness of heat transfer suppression member 40 in a state where battery module 1 has not been assembled yet. In this case, heat transfer suppression member 40 is pressed by battery 12a and plane 214a in the assembled battery module. This allows heat transfer suppression member 40 to be in contact with battery 12a and plane 214a with more certainty. Other main surface 214a2 of plane 214a and other battery 12b are in direct contact with each other.

The battery module according to the present exemplary embodiment can produce effects similar to those in the first exemplary embodiment. Furthermore, since separator 214 includes protrusion 48 and heat transfer suppression member 40 is supported by protrusion 48, deviation of heat transfer suppression member 40 can be prevented. This makes it possible to suppress a decrease in performance of the battery module with more certainty. Furthermore, protrusion 48 can be used to determine a position of heat transfer suppression member 40. This makes it possible to heighten ease of assembling of the battery module. Furthermore, a space in which at least part of heat transfer suppression member 40 is stored can be provided by protrusion 48. This makes it possible to keep heat transfer suppression member 40 from being excessively pressed.

Especially in cases such as a case where heat transfer suppression member 40 includes a fiber sheet, heat transfer suppression member 40 is easy to be elastically deformed. When the plurality of batteries 12 are fastened in stacking direction X by restraint member 6, heat transfer suppression member 40 can also be compressed by this fastening. Meanwhile, presence of protrusion 48 can suppress a change in dimension of heat transfer suppression member 40. Heat insulating performance of heat transfer suppression member 40 depends on heat conductivity of a material of which heat transfer suppression member 40 is made and a thickness of heat transfer suppression member 40. Accordingly, presence of protrusion 48 makes it possible to obtain heat insulating performance of heat transfer suppression member 40 with more certainty. Protrusion 48 preferably has a height equal to or larger than a thickness of heat transfer suppression member 40 necessary for obtaining predetermined heat insulating performance.

As illustrated in FIG. 6, a position of protrusion 48 in a direction in which plane 14a extends is deviated from sealing plate 20, i.e., a sealing body of battery 12a located at a position toward which protrusion 48 protrudes. In the present exemplary embodiment, protrusion 48 is located at a lower level than the sealing body. That is, a position where protrusion 48 and battery 12a are in contact with each other is lower than the sealing body. Restraint member 6 sandwiches the plurality of batteries 12 in stacking direction X in which batteries 12 are stacked, i.e., a direction in which protrusion 48 protrudes. Accordingly, when the plurality of batteries 12 are fastened by restraint member 6, protrusion 48 presses battery 12. Accordingly, in a case where protrusion 48 and the sealing body are level with each other, there is a possibility that a portion where the sealing body and exterior can 18 are welded is broken by being pressed by protrusion 48. Meanwhile, it is possible to prevent this welded portion from being broken by disposing protrusion 48 and the sealing body at different heights (different positions in a direction in which the bottom surface and top surface n of battery 12 are aligned).

Third Exemplary Embodiment

Figure 7:
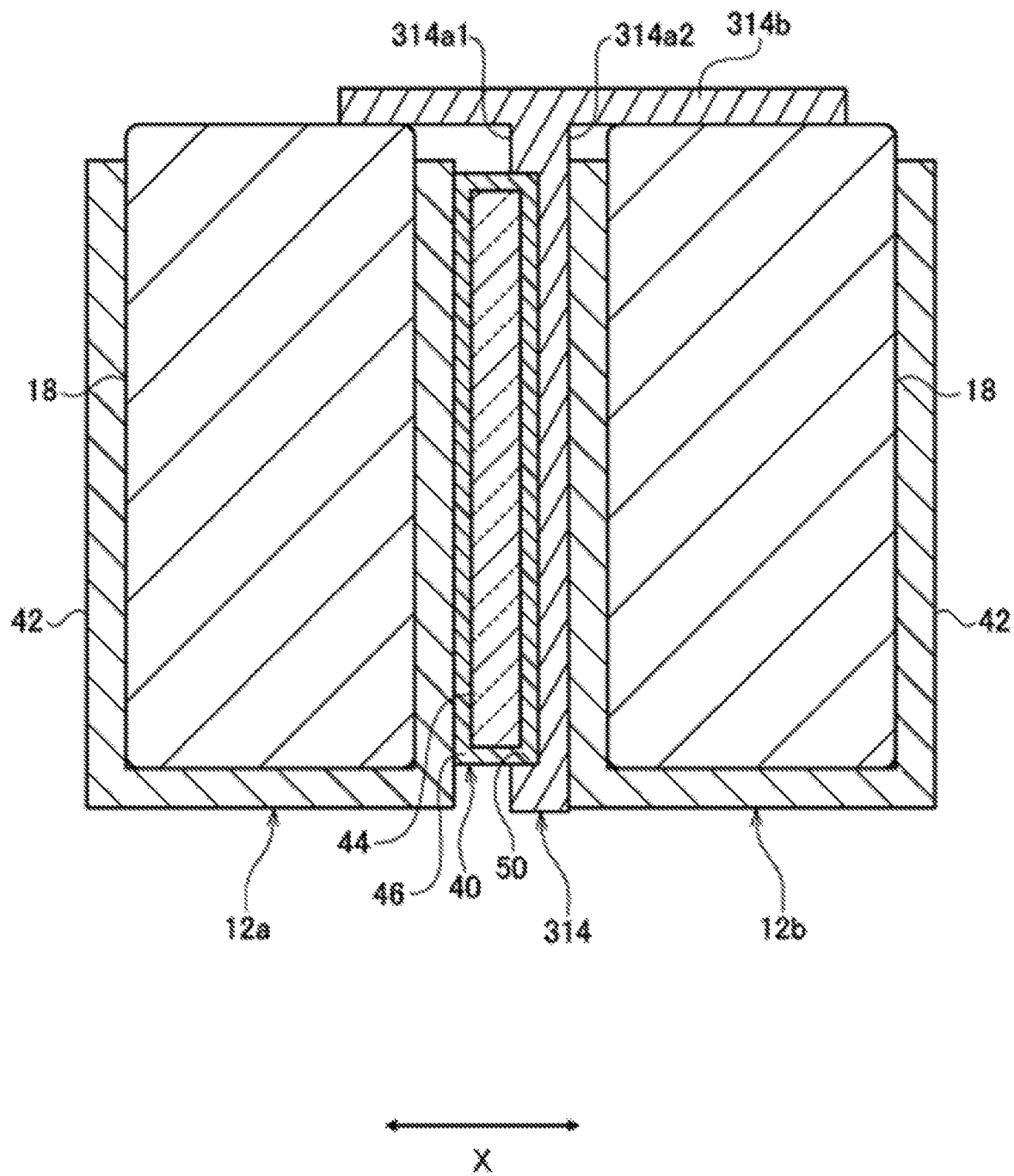
FIG. 7 is a cross-sectional view schematically illustrating a structure in which a battery, a separator, and a heat transfer suppression member in a battery module according to a third exemplary embodiment are stacked according to an exemplary embodiment of the first aspect of the present invention.

In the exemplary embodiment of the first aspect of the present invention, a battery module according to a third exemplary embodiment shares a configuration with the battery module of the first exemplary embodiment except for a dissimilarity in separator shape. The following description of the battery module according to the present exemplary embodiment is primarily given on differences between the first and third exemplary embodiments, and redundant descriptions of shared elements are omitted or simplified. FIG. 7 is a cross-sectional view schematically illustrating a structure in which a battery, a separator, and a heat transfer suppression member in the battery module according to the third exemplary embodiment are stacked. FIG. 7 illustrates any two batteries 12 (hereinafter referred to as battery 12a and battery 12b in a case where these two batteries 12 are distinguished from each other) and separator 314 and heat transfer suppression member 40 disposed between these two batteries 12. FIG. 7 illustrates a cross section extending in stacking direction X. In FIG. 7, illustration of an internal structure of battery 12 is omitted.

Separator 314 provided in the battery module according to the present exemplary embodiment has a structure similar to separator 14 except for that separator 314 includes recess 50. That is, separator 314 has plane 314a and wall 314b. Heat transfer suppression member 40 is fixed to one main surface 314a1 of plane 314a of separator 314. Heat transfer suppression member 40 is disposed inside main surface 314a1 when viewed from a direction (stacking direction X) in which heat transfer suppression member 40 and separator 14 are aligned. Heat transfer suppression member 40 has a sheet shape and has heat insulating material 44 and laminate film 46.

Furthermore, separator 314 has, on one main surface 314a1 of plane 314a, recess 50 that is recessed in a direction (stacking direction X) in which battery 12 and separator 14 are aligned. At least part of heat transfer suppression member 40 is stored in recess 50. Heat transfer suppression member 40 is supported by recess 50 in this state.

Heat transfer suppression member 40 is sandwiched between battery 12a and plane 314a of separator 314 in the assembled battery module. One main surface of heat transfer suppression member 40 is in contact with battery 12a. The other main surface of heat transfer suppression member 40 is in contact with a bottom surface of recess 50. A side surface of heat transfer suppression member 40 is in contact with a side surface of recess 50. Preferably, a depth of recess 50 is set smaller than a thickness of heat transfer suppression member 40 in a state where battery module 1 has not been assembled yet. In this case, heat transfer suppression member 40 is pressed by battery 12a and plane 314a in the assembled battery module. This allows heat transfer suppression member 40 to be in contact with battery 12a and plane 314a with more certainty. Other main surface 314a2 of plane 314a and other battery 12b are in direct contact with each other.

The battery module according to the present exemplary embodiment can produce effects similar to those in the first exemplary embodiment. Furthermore, since separator 314 includes recess 50 and heat transfer suppression member 40 is stored in recess 50, deviation of heat transfer suppression member 40 can be prevented. This can suppress a decrease in performance of the battery module with more certainty. Furthermore, recess 50 can be used to determine a position of heat transfer suppression member 40. This makes it possible to heighten ease of assembling of the battery module. Furthermore, a space in which at least part of heat transfer suppression member 40 is stored can be provided by recess 50. This makes it possible to keep heat transfer suppression member 40 from being excessively pressed. Furthermore, since heat transfer suppression member 40 is stored in recess 50, it is possible to suppress an increase in size of the battery module caused by presence of heat transfer suppression member 40.

The present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of the combined or modified exemplary embodiments.

In the above exemplary embodiments, heat transfer suppression member 40 is attached to separator 14, 214, 314, but heat transfer suppression member 40 may be attached to battery 12. In the above-described exemplary embodiments, battery 12 is a prismatic battery. However, a shape of battery 12 is not particularly limited and may be cylindrical, for example. Further, a number of batteries 12 included in a battery assembly is not particularly limited. Battery 12 may be configured not to have insulating film 42. Heat transfer suppression member 40 may be disposed on both surfaces of separator 14, 214, 314.

Any desired combinations of the above-described components and converted expressions of the present invention in methods, devices, systems, and other similar entities are still effective as aspects of the present invention.

Figure 8:
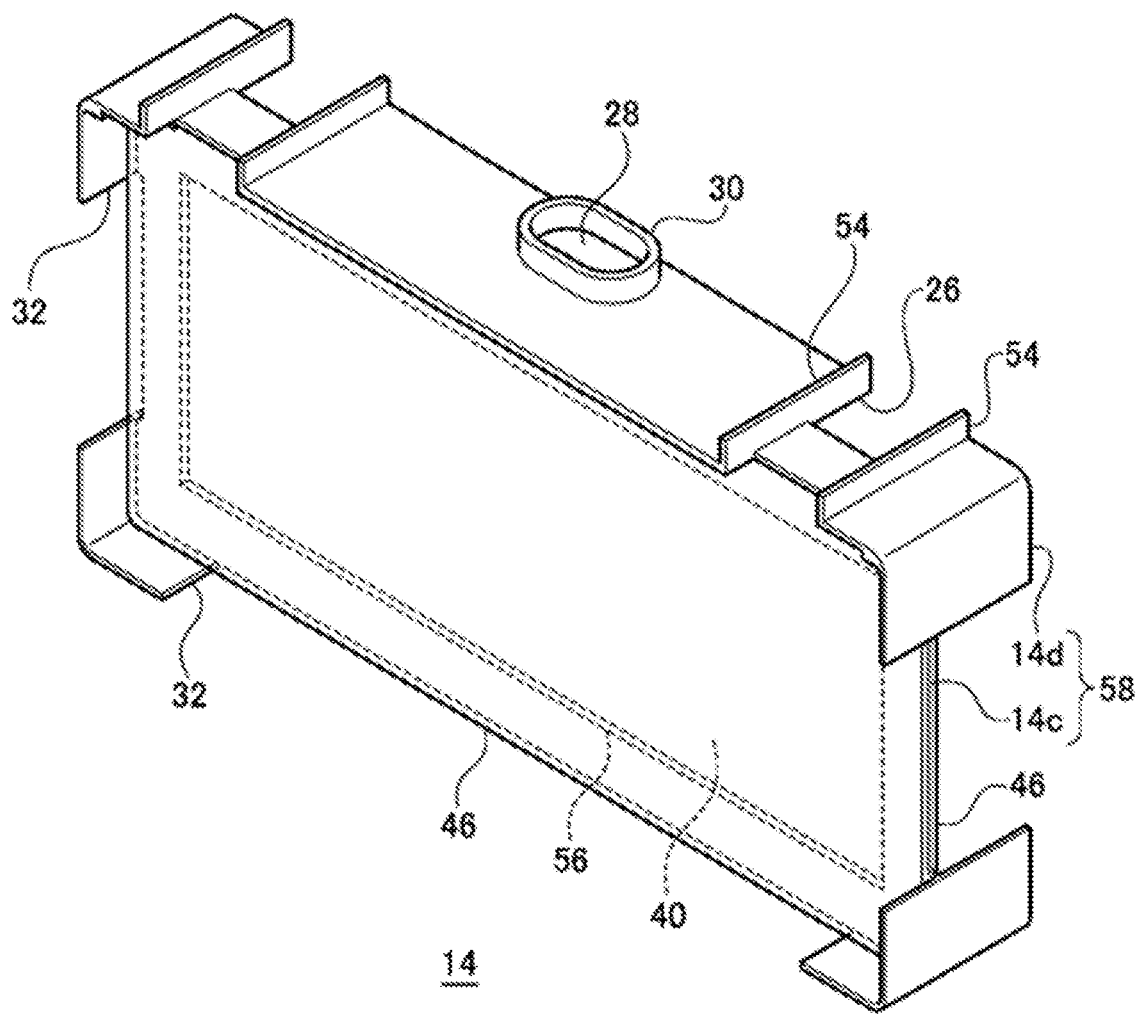
FIG. 8 is a schematic perspective view illustrating a structure of a separator in the second aspect of the present invention.
Figure 9:
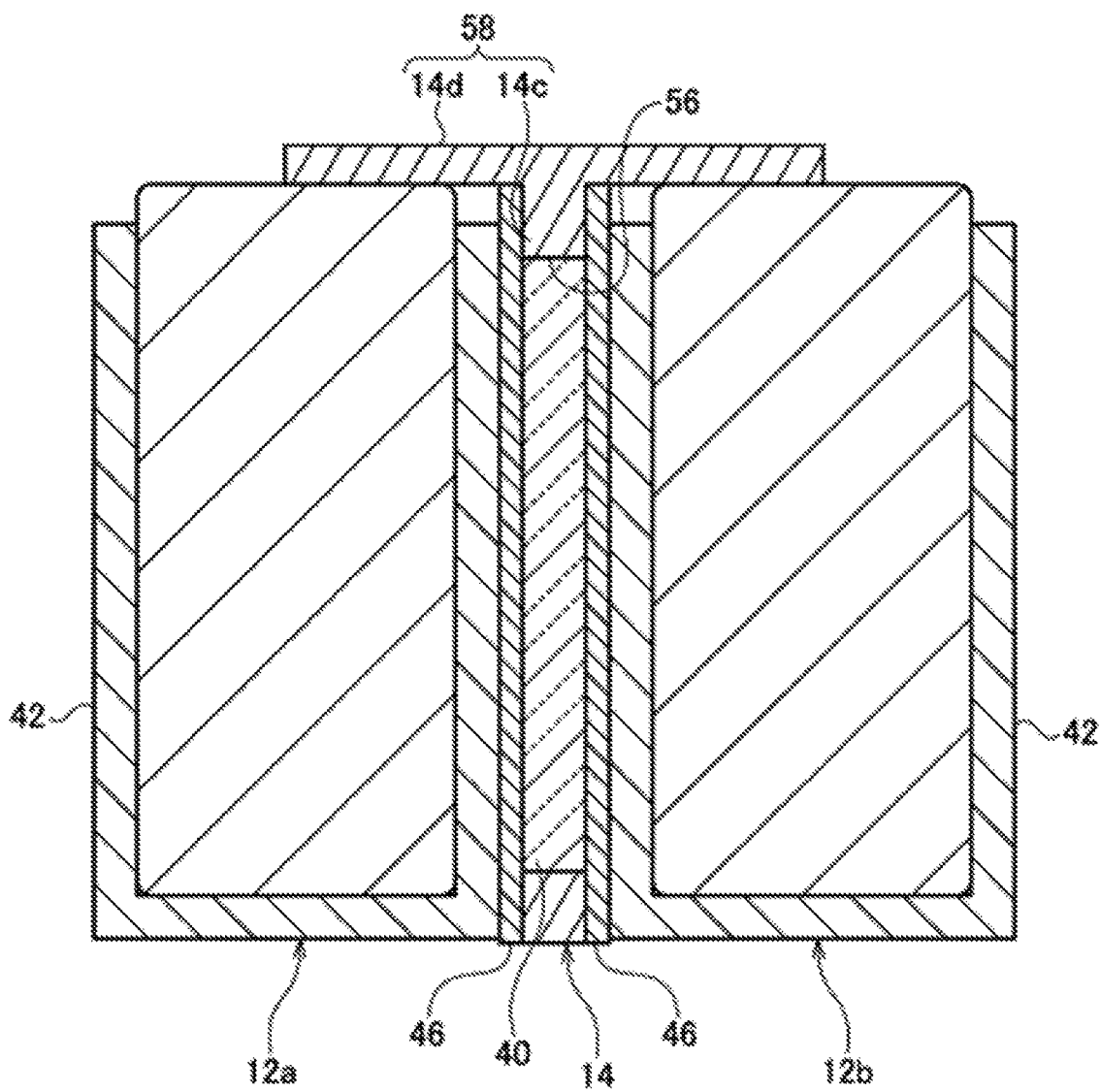
FIG. 9 is a cross-sectional view schematically illustrating a structure in which a battery and a separator are stacked in the second aspect of the present invention.

FIG. 8 is a perspective view illustrating an outline structure of separator 14 in a second aspect of the present invention. FIG. 9 is a cross-sectional view schematically illustrating a structure in which battery 12 and separator 14 are stacked. FIG. 9 illustrates any two batteries 12 (hereinafter referred to as battery 12a and battery 12b in a case where these two batteries 12 are distinguished from each other) and separator 14 disposed between these two batteries 12. FIG. 9 illustrates a cross section extending in stacking direction X. In FIG. 5, illustration of an internal structure of battery 12 is omitted.

Separator 14 includes base member 58 and heat transfer suppression member 40. Base member 58 is made of a resin. Examples of the resin forming base member 58 include thermoplastic resins such as polypropylene (PP) and polybutylene terephthalate (PBT). Base member 58 includes first part 14c that extends between two batteries and second part 14d that extends from an end of first part 14c toward battery 12 side, i.e., in stacking direction X in assembled battery module 1. Since first part 14c is a substantially rectangular plate shape and extends between main surfaces of adjacent batteries 12, exterior cans 18 of adjacent batteries 12 are insulated from each other.

Top surface n, a bottom surface, and side surfaces of battery 12 are covered with second part 14d. This can suppress a short circuit between adjacent batteries 12, which can be caused by, for example, dew condensation on a surface of battery 12 or end plate 4. In other words, a creepage distance between adjacent batteries 12 can be secured by second part 14d. In particular, second part 14d covers top surface n of battery 12, whereby the above-described short circuit can be further suppressed. In the present exemplary embodiment, a tip of second part 14d of one of two adjacent separators 14 abuts on a tip of second part 14d of other separator 14. Therefore, battery 12 is housed in a space formed by first part 14c and second part 14d. In the present exemplary embodiment, separator 14 holds battery 12 by way of second part 14d.

Second part 14d has cutout 26 at a position corresponding to output terminal 22 to expose output terminal 22 to the outside. Second part 14d also has opening 28 at a position corresponding to valve 24 to expose valve 24 to the outside. An edge of opening 28 is provided with barrier 30 projecting from a surface of second part 14d toward covering 8. Barrier 30 surrounds an entire circumference of opening 28. Second part 14d has cutout 32 at positions corresponding to the side surfaces and bottom surface of battery 12 to expose parts of the side surface and bottom surface of battery 12. A heatsink (not illustrated) is thermally connected to the side surfaces and/or the bottom surface of battery 12. Heat generated in battery 12 is released mainly through the heatsink. In assembled battery module 1, second part 14d is positioned between restraint member 6 and battery 12. This configuration prevents restraint member 6 and battery 12 from coming into contact with each other.

Separator 14 has support 54 projecting toward covering 8 and supporting covering 8 in assembled battery module 1. Support 54 is disposed on second part 14d covering top surface n of battery 12. In the present exemplary embodiment, a pair of supports 54 is disposed at both ends of cutout 26. Supports 54, which face each other through cutout 26 and are arrayed in direction Y perpendicular to stacking direction X, put a bus bar into an installation position. The bus bar is disposed between the pair of supports 54.

Separator 14 has through-hole 56. Through-hole 56 is disposed in first part 14c. Accordingly, through-hole 56 is disposed in a region that overlaps batteries 12 when viewed from stacking direction X in which batteries 12 are stacked. Through-hole 56 passes through first part 14c of separator 14 in stacking direction X in which batteries 12 are stacked. Through-hole 56 has a substantially rectangular opening shape and is disposed in a substantially central part of first part 14c. Accordingly, first part 14c has a frame shape.

At least part of heat transfer suppression member 40 is stored in through-hole 56. Accordingly, heat transfer suppression member 40 is disposed in first part 14c. In the present exemplary embodiment, whole heat transfer suppression member 40 is stored in through-hole 56. Accordingly, heat transfer suppression member 40 is disposed inside through-hole 56 when viewed from stacking direction X. Heat transfer suppression member 40 is also disposed inside through-hole 56 when viewed from direction Y orthogonal to stacking direction X. Only part of heat transfer suppression member 40 may be disposed inside through-hole 56 when viewed from direction Y. Heat transfer suppression member 40 is made of a sheet-shaped heat insulating material. A thickness of heat transfer suppression member 40 is, for example, 1 mm to 2 mm. Furthermore, in the present exemplary embodiment, through-hole 56 is blocked by heat transfer suppression member 40. This makes it possible to secure insulation between adjacent batteries 12 with more certainty even in a case where batteries 12 expand.

A heat insulating material of which heat transfer suppression member 40 is made has a structure such that a porous material such as silica xerogel is held between fibers of a fiber sheet made of non-woven fabric or the like. Silica xerogel has a nano-size void structure that regulates movement of air molecules and has low heat conductivity. Heat conductivity of the heat insulating material is approximately 0.018 W/m·K to 0.024 W/m·K. The heat insulating material is useful especially as a heat insulating material used in a narrow space. The heat conductivity of the heat insulating material is lower than heat conductivity of air. Accordingly, presence of heat transfer suppression member 40 provided in battery module 1 can keep heat transfer between batteries 12 smaller than a case where an air layer is provided as a heat insulating layer between batteries 12. Furthermore, the heat conductivity of heat transfer suppression member 40 is much lower than heat conductivity of base member 58.

Silica xerogel can stably maintain the structure against pressure from an outside. This makes it possible to stably maintain heat insulating performance of the heat insulating material irrespective of tightening in stacking direction X by restraint member 6. Accordingly, presence of heat transfer suppression member 40 provided in battery module 1 can more stably suppress heat transfer between batteries 12 than a case where an air layer is provided as a heat insulating layer between batteries 12. Furthermore, since the heat insulating material has lower heat conductivity than air, a similar heat insulating effect can be obtained with a thickness smaller than an air layer. It is therefore possible to suppress an increase in size of battery module 1.

Laminate film 46 is stacked on a surface of heat transfer suppression member 40. A peripheral part of laminate film 46 is adhered to first part 14c. Laminate film 46 is stacked on both sides of heat transfer suppression member 40. Accordingly, heat transfer suppression member 40 is stored in a space partitioned by first part 14c (inner side surfaces of through-hole 56) and two laminate films 46. Laminate film 46 coats a surface of heat transfer suppression member 40 and thereby keeps the porous material in the heat insulating material from being detached from the fiber sheet. Laminate film 46 is, for example, made of polyethylene terephthalate (PET).

Heat transfer suppression member 40 has higher heat resistance than first part 14c. More specifically, the fiber sheet includes fibers that have a higher melting point than separator 14 and/or the porous material is made of a substance that has a higher melting point than separator 14. For example, heat transfer suppression member 40 has a melting point of 300° C. or higher. Specifically, the fiber sheet and/or the porous material that constitute the heat insulating material have a melting point of 300° C. or higher. In particular, the fibers that constitute the fiber sheet preferably have a melting point of 300° C. or higher. This makes it possible to maintain a state where the porous material is held by the fiber sheet even in a case where the heat insulating material is exposed to a high temperature. As described above, by making the heat resistance of heat transfer suppression member 40 higher than the heat resistance of separator 14, it is possible to leave heat transfer suppression member 40 even in a case where first part 14c melts due to heat generated by battery 12. Accordingly, insulation between batteries 12 can be maintained by heat transfer suppression member 40 even in a case where first part 14c melts. Furthermore, a state where heat transfer between adjacent batteries 12 is suppressed can be maintained for a longer period. In the present exemplary embodiment, heat resistance of heat transfer suppression member 40 is higher than heat resistance of whole base member 58.

Heat transfer suppression member 40 is disposed between battery 12a and battery 12b in assembled battery module 1. One main surface of heat transfer suppression member 40 is connected to battery 12a through laminate film 46. The other main surface of heat transfer suppression member 40 is connected to battery 12b through laminate film 46. A separator disposed between end plate 4 and battery 12 adjacent to this end plate 4 has a structure similar to separator 14 except for that this separator does not have through-hole 56 and heat transfer suppression member 40. Since the separator extends between battery 12 and end plate 4, exterior can 18 of battery 12 and end plate 4 are insulated from each other.

Separator 14 is produced by integrally molding base member 58 and heat transfer suppression member 40. That is, separator 14 includes an integrally molded product obtained by integrally molding base member 58 made of a resin and heat transfer suppression member 40. For example, separator 14 is manufactured by insert molding that is an example of integral molding. FIGS. 10A through 10D are process diagrams schematically illustrating a method for manufacturing separator 14 according to the first exemplary embodiment.

Figure 10A:
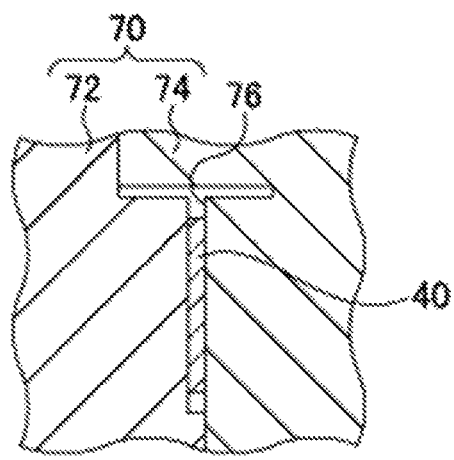
FIGS. 10A through 10D are process diagrams schematically illustrating a method for manufacturing a separator according to the first exemplary embodiment in the second aspect of the present invention.

First, metal mold 70 is prepared as illustrated in FIG. 10A. Metal mold 70 includes core-side metal mold 72 and cavity-side metal mold 74. Core-side metal mold 72 and cavity-side metal mold 74 are closed in a state where heat transfer suppression member 40 is disposed as an insert member at a predetermined position of core-side metal mold 72. This causes molding space 76 corresponding to a shape of base member 58 to be formed between core-side metal mold 72 and cavity-side metal mold 74. Next, core-side metal mold 72 and cavity-side metal mold 74 are heated and kept at a predetermined temperature.

Figure 10B:
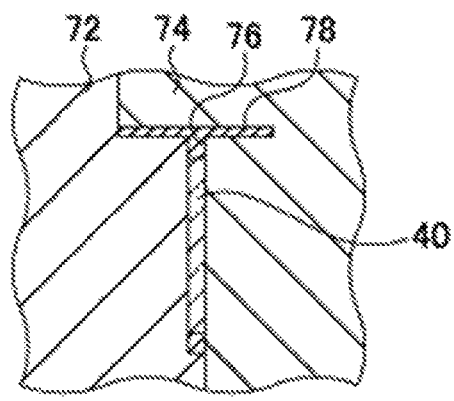

Subsequently, as illustrated in FIG. 10B, a resin for base member 58 is molten by being heated to a predetermined temperature in a molding machine (not illustrated). Next, a nozzle (not illustrated) of the molding machine is brought into contact with metal mold 70, and molten resin 78 is ejected into metal mold 70. Molten resin 78 is ejected into molding space 76 through a runner and a gate (both of which are not illustrated) in metal mold 70. Whole molding space 76 is filled with molten resin 78.

Figure 10C:
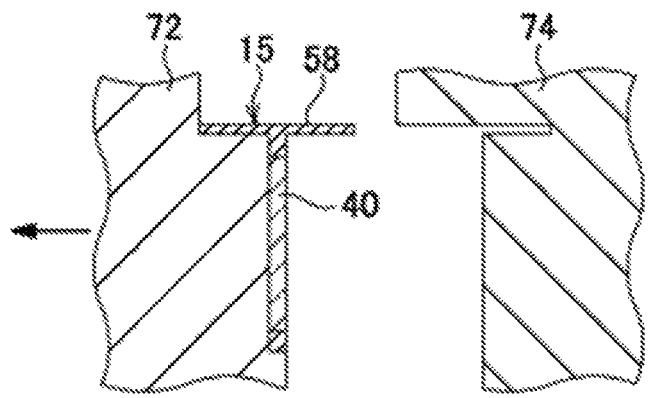

Subsequently, as illustrated in FIG. 10C, integrally molded product 15 constituted by base member 58 and heat transfer suppression member 40 is obtained by cooling molten resin 78 with which metal mold 70 is filled. After molten resin 78 is cooled, core-side metal mold 72 is separated from cavity-side metal mold 74. Integrally molded product 15 is moved together with core-side metal mold 72 while adhering to core-side metal mold 72.

Figure 10D:
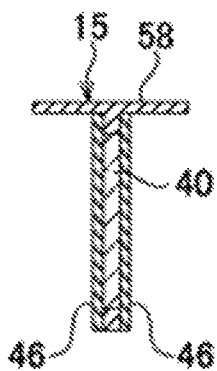

Subsequently, as illustrated in FIG. 10D, a push-out mechanism (not illustrated) is projected from core-side metal mold 72. This detaches integrally molded product 15 from core-side metal mold 72. Then, separator 14 is obtained by providing laminate film 46 on integrally molded product 15. In the step of providing laminate film 46, laminate film 46 is adhered to base member 58. A surface of heat transfer suppression member 40 is thus coated with laminate film 46.

As described above, in the second aspect of the present invention, battery module 1 according to the present exemplary embodiment includes the plurality of batteries 12 that are stacked, and separator 14 that is disposed between two adjacent batteries 12 and insulates these two batteries 12 from each other. Separator 14 includes integrally molded product 15 obtained by integrally molding base member 58 that is made of a resin and includes first part 14c extending between two batteries 12 and heat transfer suppression member 40 disposed in first part 14c. A method for manufacturing separator 14 according to the present exemplary embodiment includes integrally molding base member 58 including first part 14c extending between two batteries 12 and heat transfer suppression member 40 disposed in first part 14c in assembled battery module 1.

As described above, separator 14 has a structure obtained by integrally molding base member 58 and heat transfer suppression member 40. Therefore, use of separator 14 in battery module 1 allows heat transfer suppression member 40 to extend between two batteries 12. With the configuration in which heat transfer suppression member 40 extends between two batteries 12, even in a case where a temperature of any battery 12 rises excessively during use of battery module 1, it is possible to keep heat of this battery 12 from transferring to adjacent battery 12. This makes it possible to suppress a cycle of overheat, thereby avoiding a decrease in performance of battery module 1. According to battery module 1 according to the present exemplary embodiment, a cycle of thermal runaway can be suppressed even in a case where thermal runaway of battery 12 occurs.

Furthermore, by integrally molding base member 58 and heat transfer suppression member 40, a state where heat transfer suppression member 40 is located between two batteries 12 can be maintained with more certainty. This can suppress a decrease in performance of the battery module with more certainty. Heat transfer suppression member 40 can be incorporated into battery module 1 without separately preparing a step of providing heat transfer suppression member 40 in separator 14. Furthermore, an increase in a number of components caused by providing heat transfer suppression member 40 can be kept small. This makes it possible to heighten ease of assembling of battery module 1.

Separator 14 has through-hole 56 in first part 14c that overlaps batteries 12 in stacking direction X in which batteries 12 are stacked. At least part of heat transfer suppression member 40 is stored in through-hole 56. This can suppress an increase in size of battery module 1 caused by presence of heat transfer suppression member 40. Furthermore, a space in which at least part of heat transfer suppression member 40 is stored can be provided by through-hole 56. This keeps heat transfer suppression member 40 from being excessively pressed.

Especially in cases such as a case where heat transfer suppression member 40 includes a fiber sheet, heat transfer suppression member 40 is easy to be elastically deformed. When the plurality of batteries 12 are fastened in stacking direction X by restraint member 6, heat transfer suppression member 40 can also be compressed by this fastening. Meanwhile, presence of through-hole 56 can suppress a change in dimension of heat transfer suppression member 40. Heat insulating performance of heat transfer suppression member 40 depends on heat conductivity of a material of which heat transfer suppression member 40 is made and a thickness of heat transfer suppression member 40. Presence of through-hole 56 makes it possible to obtain heat insulating performance of heat transfer suppression member 40 with more certainty. Through-hole 56 preferably has a depth equal to or larger than a thickness of heat transfer suppression member 40 necessary for obtaining predetermined heat insulating performance.

Heat transfer suppression member 40 has higher heat resistance than first part 14c. Accordingly, insulation between batteries 12 can be maintained even in a case where first part 14c melts due to heat generated by batteries 12. Furthermore, heat transfer between batteries 12 can be suppressed for a longer period.

Second Exemplary Embodiment

Figure 11:
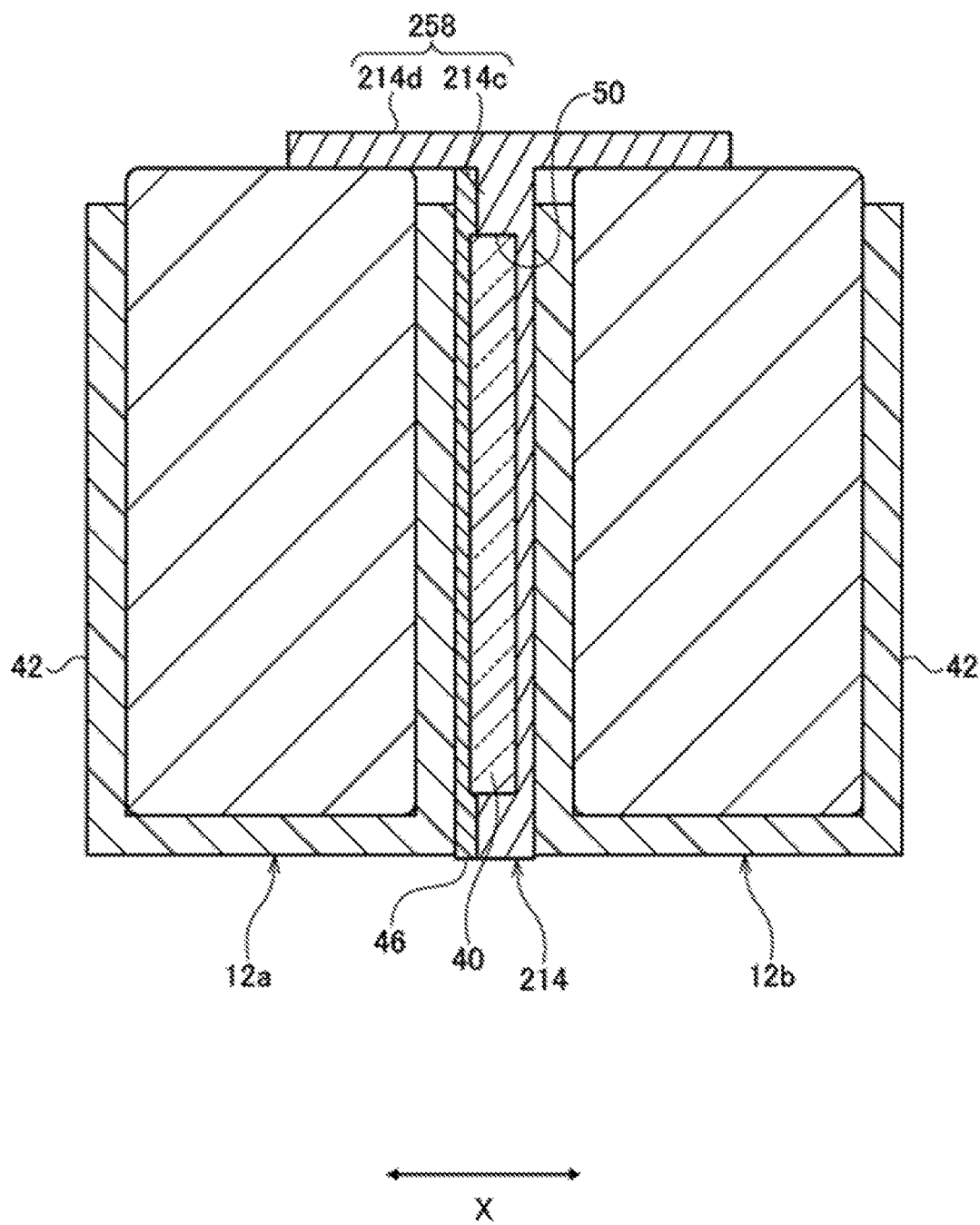
FIG. 11 is a cross-sectional view schematically illustrating a structure in which a battery and a separator in a battery module according to the second exemplary embodiment are stacked in the second aspect of the present invention.

In the second aspect of the present invention, a battery module according to a second exemplary embodiment shares a configuration with the battery module of the first exemplary embodiment except for a dissimilarity in separator shape. The following description of the battery module according to the present exemplary embodiment is primarily given on differences between the first and second exemplary embodiments, and redundant descriptions of shared elements are omitted or simplified. FIG. 11 is a cross-sectional view schematically illustrating a structure in which a battery and a separator in a battery module according to the second exemplary embodiment are stacked. FIG. 11 illustrates any two batteries 12 (hereinafter referred to as battery 12a and battery 12b in a case where these two batteries 12 are distinguished from each other) and separator 214 disposed between these two batteries 12. FIG. 11 illustrates a cross section extending in stacking direction X. In FIG. 11, illustration of an internal structure of battery 12 is omitted.

Separator 214 provided in the battery module according to the present exemplary embodiment has a structure similar to separator 14 except for that separator 214 includes recess 50 instead of through-hole 56. That is, separator 214 includes base member 258 and heat transfer suppression member 40. Base member 258 includes first part 214c and second part 214d.

Separator 214 has recess 50. Recess 50 is disposed on one main surface of first part 214c. In the present exemplary embodiment, recess 50 is provided on a main surface of first part 214c that faces battery 12a side. Accordingly, recess 50 is disposed in a region that overlaps batteries 12 when viewed from stacking direction X in which batteries 12 are stacked. Recess 50 is recessed in the direction in which batteries 12 are stacked.

At least part of heat transfer suppression member 40 is stored in recess 50. Accordingly, heat transfer suppression member 40 is disposed in first part 214c. In the present exemplary embodiment, whole heat transfer suppression member 40 is disposed inside recess 50 when viewed from stacking direction X. Part of heat transfer suppression member 40 is disposed inside recess 50 when viewed from direction Y orthogonal to stacking direction X. Whole heat transfer suppression member 40 may be disposed inside recess 50 when viewed from direction Y. Laminate film 46 is stacked on a surface of heat transfer suppression member 40. A peripheral part of laminate film 46 is adhered to first part 214c.

Heat transfer suppression member 40 is disposed between battery 12a and battery 12b in the assembled battery module. One main surface of heat transfer suppression member 40 is connected to battery 12a through laminate film 46. The other main surface of heat transfer suppression member 40 is in contact with a bottom surface of recess 50. First part 214c and other battery 12b are in direct contact with each other.

Separator 214 includes an integrally molded product obtained by integrally molding base member 258 made of a resin and heat transfer suppression member 40. That is, separator 214 is manufactured by integrally molding base member 256 and heat transfer suppression member 40. For example, separator 214 is manufactured by insert molding that is an example of integral molding. A method for manufacturing separator 214 is similar to the method for manufacturing separator 14 according to the first exemplary embodiment.

The battery module according to the present exemplary embodiment can produce effects similar to those in the first exemplary embodiment. Furthermore, one laminate film 46 can be omitted by putting heat transfer suppression member 40 in recess 50.

Regarding the second aspect of the present invention, the present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of the combined or modified exemplary embodiments.

In the above-described exemplary embodiments, battery 12 is a prismatic battery. However, a shape of battery 12 is not particularly limited and may be cylindrical, for example. Further, a number of batteries 12 included in a battery assembly is not particularly limited. Battery 12 may be configured not to have insulating film 42.

Any desired combinations of the above-described components and converted expressions of the present invention in methods, devices, systems, and other similar entities are still effective as aspects of the present invention.

Figure 12:
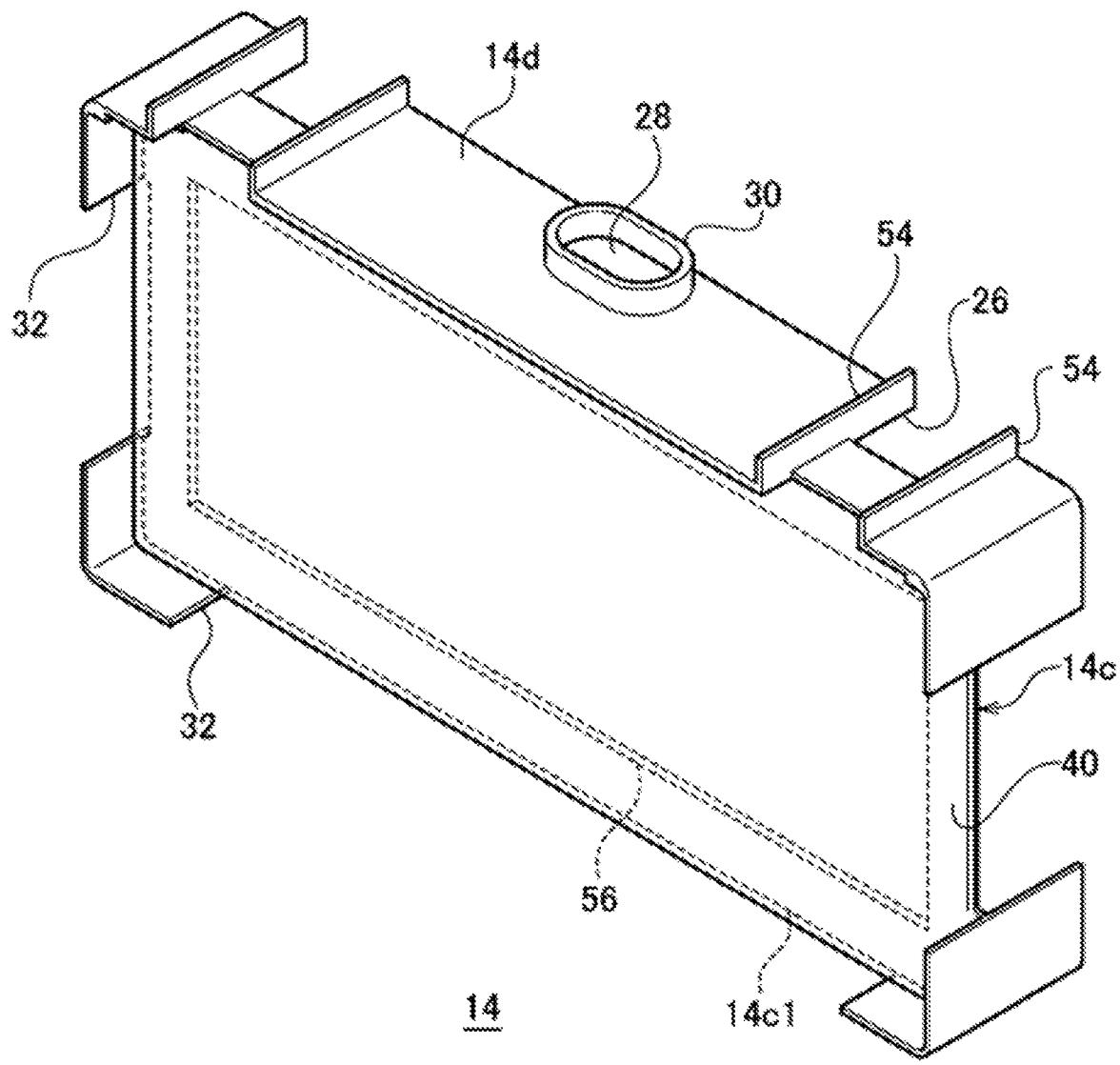
FIG. 12 is a schematic perspective view illustrating a structure of a separator and a heat transfer suppression member according to the third aspect of the present invention.
Figure 13:
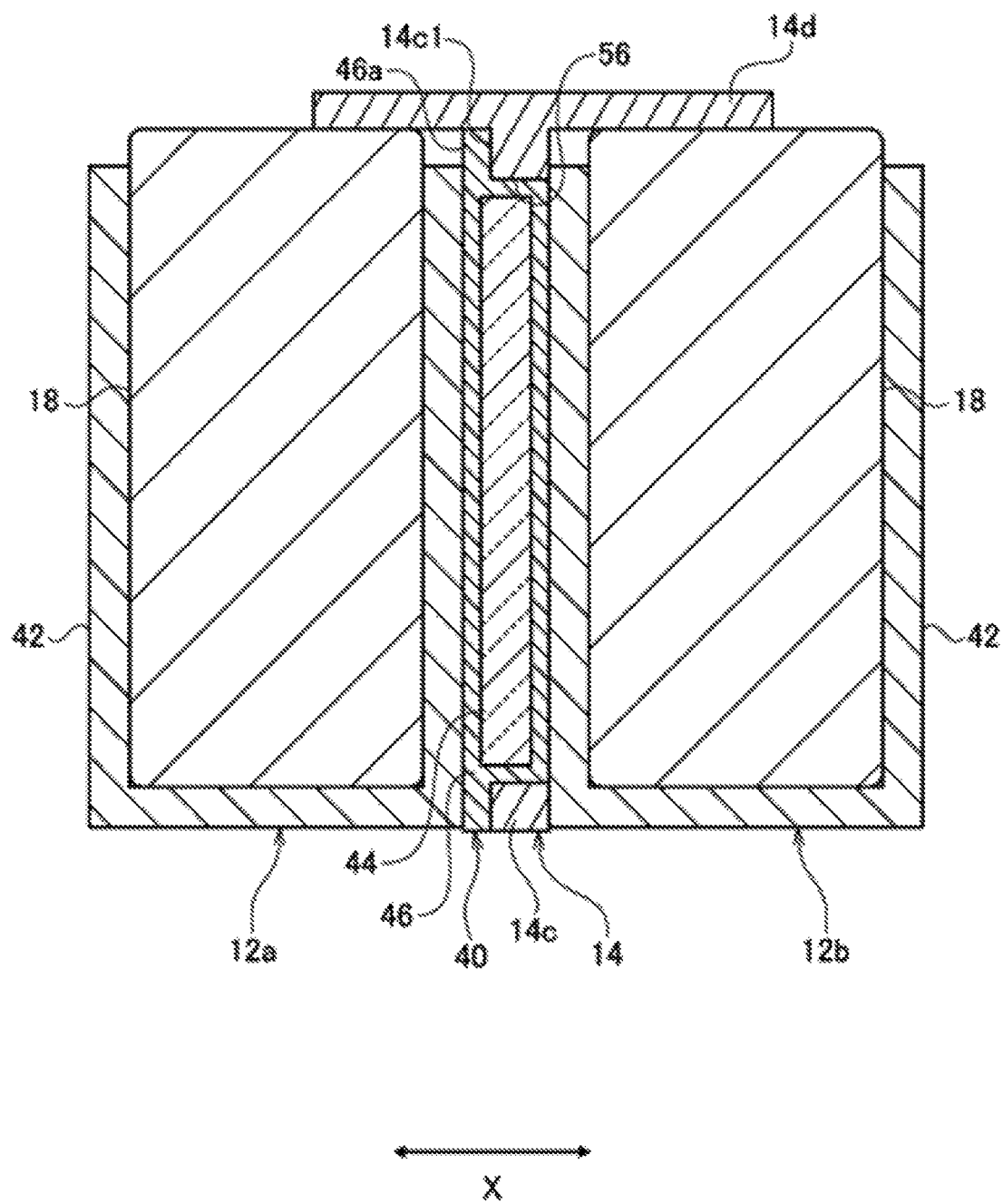
FIG. 13 is a cross-sectional view schematically illustrating a structure in which a battery, a separator, and a heat transfer suppression member are stacked in the third aspect of the present invention.

Next, an exemplary embodiment of a third aspect is described. FIG. 12 is a perspective view illustrating an outline structure of separator 14 and heat transfer suppression member 40. FIG. 13 is a cross-sectional view schematically illustrating a structure in which a battery, a separator, and a heat transfer suppression member are stacked. FIG. 13 illustrates any two batteries 12 (hereinafter referred to as battery 12a and battery 12b in a case where these two batteries 12 are distinguished from each other) and separator 14 and heat transfer suppression member 40 disposed between these two batteries 12. FIG. 13 illustrates a cross section extending in stacking direction X. In FIG. 13, illustration of an internal structure of battery 12 is omitted.

Separator 14 includes first part 14c that extends between two batteries 12 and second part 14d that extends from an end of first part 14c toward battery 12 side, i.e., in stacking direction X. Since first part 14c has a substantially rectangular plate shape and extends between main surfaces of adjacent batteries 12, exterior cans 18 of adjacent batteries 12 are insulated from each other.

Top surface n, a bottom surface, and side surfaces of battery 12 are covered with second part 14d. This can suppress a short circuit between adjacent batteries 12, which can be caused by, for example, dew condensation on a surface of battery 12 or end plate 4. In other words, a creepage distance between adjacent batteries 12 can be secured by second part 14d. In particular, second part 14d covers top surface n of battery 12, whereby the above-described short circuit can be further suppressed. In the present exemplary embodiment, a tip of second part 14d of one of two adjacent separators 14 abuts on a tip of second part 14d of other separator 14. Therefore, battery 12 is housed in a space formed by first part 14c and second part 14d. In the present exemplary embodiment, separator 14 holds battery 12 by way of second part 14d.

Second part 14d has cutout 26 at a position corresponding to output terminal 22 to expose output terminal 22 to the outside. Second part 14d also has opening 28 at a position corresponding to valve 24 to expose valve 24 to the outside. An edge of opening 28 is provided with barrier 30 projecting from a surface of second part 14d toward covering 8. Barrier 30 surrounds an entire circumference of opening 28. Second part 14d has cutout 32 at positions corresponding to the side surfaces and bottom surface of battery 12 to expose parts of the side surfaces and bottom surface of battery 12. A heatsink (not illustrated) is thermally connected to the side surfaces and/or the bottom surface of battery 12. Heat generated in battery 12 is released mainly through the heatsink. In assembled battery module 1, second part 14d is positioned between restraint member 6 and battery 12. This configuration prevents restraint member 6 and battery 12 from coming into contact with each other.

Separator 14 has support 54 projecting toward covering 8 and supporting covering 8 in assembled battery module 1. Support 54 is disposed on second part 14d covering top surface n of battery 12. In the present exemplary embodiment, a pair of supports 54 is disposed at both ends of cutout 26. Supports 54, which face each other through cutout 26 and are arrayed in direction Y perpendicular to stacking direction X, put a bus bar into an installation position. The bus bar is disposed between the pair of supports 54.

Separator 14 has through-hole 56. Through-hole 56 is disposed in first part 14c. Accordingly, through-hole 56 is disposed in a region that overlaps batteries 12 when viewed from stacking direction X in which batteries 12 are stacked. Through-hole 56 passes through first part 14c of separator 14 in stacking direction X. Through-hole 56 has a substantially rectangular opening shape and is disposed in a substantially central part of first part 14c. Accordingly, first part 14c has a frame shape.

Heat transfer suppression member 40 is fitted in through-hole 56. Heat transfer suppression member 40 has a sheet shape and has heat insulating material 44 and laminate film 46. A thickness of heat transfer suppression member 40 is, for example, 1 mm to 2 mm.

Heat insulating material 44 has a sheet shape and has a structure such that a porous material such as silica xerogel is held between fibers of a fiber sheet made of non-woven fabric or the like. Silica xerogel has a nano-size void structure that regulates movement of air molecules and has low heat conductivity. Heat conductivity of heat insulating material 44 is approximately 0.018 W/m·K to 0.024 W/m·K. Heat insulating material 44 is useful especially as a heat insulating material used in a narrow space. The heat conductivity of heat insulating material 44 is lower than heat conductivity of air. Accordingly, presence of heat transfer suppression member 40 provided in battery module 1 can keep heat transfer between batteries 12 smaller than a case where an air layer is provided as a heat insulating layer between batteries 12. Furthermore, the heat conductivity of heat transfer suppression member 40 is much lower than heat conductivity of separator 14.

Silica xerogel can stably maintain the structure against pressure from an outside. This makes it possible to stably maintain heat insulating performance of heat insulating material 44 irrespective of tightening in stacking direction X by restraint member 6. Accordingly, presence of heat transfer suppression member 40 provided in battery module 1 can more stably suppress heat transfer between batteries 12 than a case where an air layer is provided as a heat insulating layer between batteries 12. Furthermore, since heat insulating material 44 has lower heat conductivity than air, a similar heat insulating effect can be obtained with a thickness smaller than an air layer. It is therefore possible to suppress an increase in size of battery module 1.

Laminate film 46 is a member that wraps up whole heat insulating material 44 so as to protect heat insulating material 44. Laminate film 46 keeps the porous material in heat insulating material 44 from being detached from the fiber sheet. Furthermore, heat transfer suppression member 40 can be easily adhered to separator 14 since heat transfer suppression member 40 has a structure such that heat insulating material 44 is coated with laminate film 46. Laminate film 46 is, for example, made of polyethylene terephthalate (PET).

Heat transfer suppression member 40 has higher heat resistance than separator 14. More specifically, heat resistance of heat insulating material 44 is higher than heat resistance of separator 14. More specifically, the fiber sheet includes fibers that have a higher melting point than separator 14 and/or the porous material is made of a substance that has a higher melting point than separator 14. For example, heat insulating material 44 has a melting point of 300° C. or higher. Specifically, the fiber sheet and/or the porous material that constitute heat insulating material 44 have a melting point of 300° C. or higher. In particular, the fibers that constitute the fiber sheet preferably have a melting point of 300° C. or higher. This makes it possible to maintain a state where the porous material is held by the fiber sheet even in a case where heat insulating material 44 is exposed to a high temperature. As described above, by making the heat resistance of heat transfer suppression member 40 higher than the heat resistance of separator 14, it is possible to leave heat transfer suppression member 40 even in a case where separator 14 melts due to heat generated by batteries 12. Accordingly, insulation between batteries 12 can be maintained by heat transfer suppression member 40 even in a case where separator 14 melts. Furthermore, a state where heat transfer between adjacent batteries 12 is suppressed can be maintained for a longer period.

At least part of heat transfer suppression member 40 is stored in through-hole 56. Heat transfer suppression member 40 according to the present exemplary embodiment is configured such that an area of projection, in stacking direction X, of a part combining heat insulating material 44 and regions of laminate film 46 that cover side surfaces (surfaces connecting two main surfaces of heat insulating material 44) of heat insulating material 44 is equal to or smaller than an opening area of through-hole 56. This part is inserted into through-hole 56. This part corresponds to a part excluding flange part 46a that will be described later. Accordingly, heat insulating material 44 is disposed inside through-hole 56 when viewed from stacking direction X. At least part of heat insulating material 44 is disposed in through-hole 56 when viewed from direction Y perpendicular to stacking direction X.

Laminate film 46 has flange part 46a that overlaps an edge of through-hole 56 when viewed from stacking direction X. The edge of through-hole 56 is a region of surface 14c1 of first part 14c facing battery 12a side and is a region in contact with through-hole 56. Flange part 46a protrudes in a direction orthogonal to stacking direction X from a side end surface of a part of laminate film 46 that covers heat insulating material 44. Flange part 46a protrudes from an end of the side end surface on battery 12a side. Flange part 46a is provided along an entire periphery of heat insulating material 44.

A surface of flange part 46a that faces battery 12b is in contact with surface 14c1 of first part 14c. Heat transfer suppression member 40 and separator 14 are fixed to each other by using an adhesive in a portion where flange part 46a and surface 14c1 are in contact with each other. A front end of flange part 46a is in contact with second part 14d.

Heat transfer suppression member 40 is sandwiched between battery 12a and battery 12b in assembled battery module 1. One main surface of heat transfer suppression member 40 is in contact with battery 12a. Other main surface of heat transfer suppression member 40 is in contact with battery 12b. A separator disposed between end plate 4 and battery 12 adjacent to this end plate 4 has a structure identical to separator 14 except for that this separator does not have through-hole 56 in first part 14c. Since this separator extends between battery 12 and end plate 4, exterior can 18 of battery 12 and end plate 4 are insulated from each other.

As described above, battery module 1 according to the present exemplary embodiment includes the plurality of batteries 12 that are stacked, separator 14 that is disposed between two adjacent batteries 12 and insulates these two batteries 12 from each other, and heat transfer suppression member 40 disposed between two adjacent batteries 12. With this configuration, even in a case where a temperature of any battery 12 rises excessively during use of battery module 1, it is possible to keep heat of this battery 12 from transferring to adjacent battery 12. This makes it possible to suppress a cycle of overheat, thereby avoiding a decrease in performance of battery module 1. According to battery module 1 according to the present exemplary embodiment, a cycle of thermal runaway can be suppressed even in a case where thermal runaway of battery 12 occurs.

Separator 14 has through-hole 56 in a region that overlaps batteries 12 in stacking direction X in which batteries 12 are stacked. At least part of heat transfer suppression member 40 is stored in through-hole 56. This can suppress an increase in size of battery module 1 caused by presence of heat transfer suppression member 40. Since heat transfer suppression member 40 is supported by through-hole 56, deviation of heat transfer suppression member 40 can be prevented. This can suppress a decrease in performance of the battery module with more certainty. Furthermore, through-hole 56 can be used to determine a position of heat transfer suppression member 40. This makes it possible to heighten ease of assembling of the battery module. Furthermore, a space in which at least part of heat transfer suppression member 40 is stored can be provided by through-hole 56. This keeps heat transfer suppression member 40 from being excessively pressed.

Especially in cases such as a case where heat transfer suppression member 40 includes a fiber sheet, heat transfer suppression member 40 is easy to be elastically deformed. When the plurality of batteries 12 are fastened in stacking direction X by restraint member 6, heat transfer suppression member 40 can also be compressed by this fastening. Meanwhile, presence of through-hole 56 can suppress a change in dimension of heat transfer suppression member 40. Heat insulating performance of heat transfer suppression member 40 depends on heat conductivity of a material of which heat transfer suppression member 40 is made and a thickness of heat transfer suppression member 40. Presence of through-hole 56 makes it possible to obtain heat insulating performance of heat transfer suppression member 40 with more certainty. Through-hole 56 preferably has a depth equal to or larger than a thickness of heat transfer suppression member 40 necessary for obtaining predetermined heat insulating performance.

Laminate film 46 of heat transfer suppression member 40 has flange part 46a that overlaps an edge of through-hole 56. Presence of flange part 46a can increase a contact area between heat transfer suppression member 40 and separator 14. This makes it possible to fix heat transfer suppression member 40 and separator 14 to each other with more certainty. Furthermore, since a periphery of through-hole 56 is sealed by flange part 46a, entry of dew condensation water and the like into through-hole 56 can be made less likely. This can secure insulation between battery 12a and battery 12b with more certainty.

A front end of flange part 46a is in contact with second part 14d. This makes it possible to determine a position of heat transfer suppression member 40 in a direction (the up-down direction in FIG. 13) in which flange part 46a protrudes, thereby preventing deviation of heat transfer suppression member 40 with more certainty. A front end of flange part 46a need not necessarily be in contact with second part 14d. For example, it is also possible to employ a configuration in which heat insulating material 44 is disposed in through-hole 56 and flange part 46a is disposed along a periphery of through-hole 56.

Heat transfer suppression member 40 has higher heat resistance than separator 14. Accordingly, insulation between batteries 12 can be maintained even in a case where separator 14 melts due to heat generated by batteries 12. Furthermore, heat transfer between batteries 12 can be suppressed for a longer period.

Laminate film 46 may be made of a material that is hard enough to prevent flange part 46a from being deformed by weight of heat transfer suppression member 40. This can further suppress deviation of heat transfer suppression member 40 and further increase ease of assembling of heat transfer suppression member 40. Furthermore, it is possible to achieve design in which separator 14 and heat transfer suppression member 40 are fixed to each other just by fitting heat transfer suppression member 40 into through-hole 56 and second part 14d without use of an adhesive. It is therefore possible to further increase ease of assembling of heat transfer suppression member 40.

The present invention is not limited to the above-described exemplary embodiments, and further modification, such as various design changes, can be added thereto based on knowledge of the person of ordinary skill in the art. The further modified exemplary embodiments are also included in the scope of the present invention. A new exemplary embodiment made by adding modification thereto has effects of the combined or modified exemplary embodiments.

In the above-described exemplary embodiments, battery 12 is a prismatic battery. However, a shape of battery 12 is not particularly limited and may be cylindrical, for example. Further, a number of batteries 12 included in a battery assembly is not particularly limited. Battery 12 may be configured not to have insulating film 42. Flange part 46a may be intermittently provided.

Any desired combinations of the above-described components and converted expressions of the present invention in methods, devices, systems, and other similar entities are still effective as aspects of the present invention.

Figure 14:
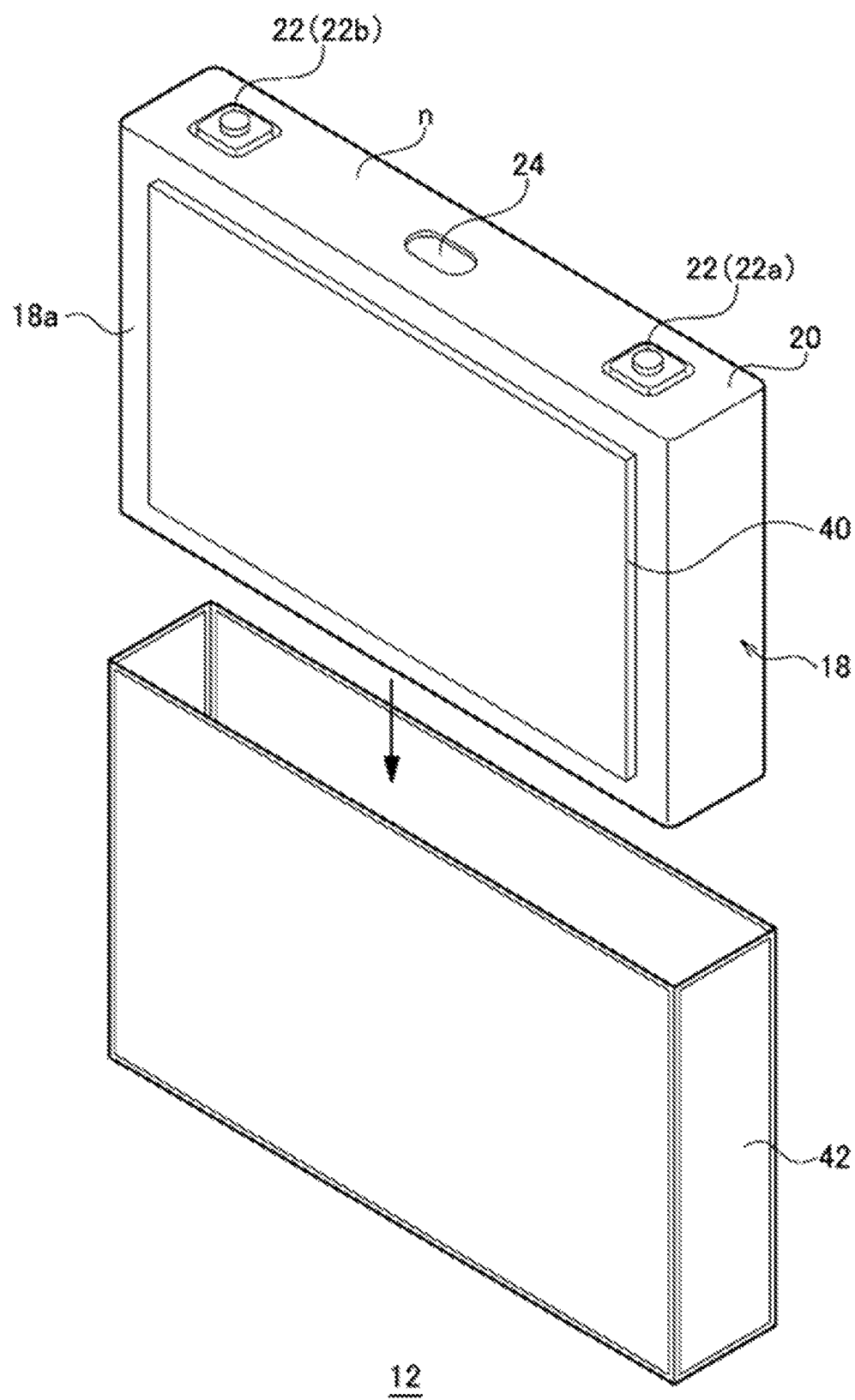
FIG. 14 is a schematic perspective view illustrating a structure of a battery in a fourth aspect of the present invention.

Next, an exemplary embodiment of a fourth aspect is described. FIG. 14 is a schematic perspective view illustrating a structure of battery 12. In the present exemplary embodiment, battery 12 includes heat transfer suppression member 40. A configuration of battery 12 other than this point is identical to battery 12 in the first, second, and third aspects, and identical configuration elements are given identical reference signs.

Heat transfer suppression member 40 is made of a sheet-shaped heat insulating material. A thickness of heat transfer suppression member 40 is, for example, 1 mm to 2 mm. Heat transfer suppression member 40 is disposed between exterior can 18 and insulating film 42 (see FIG. 16). One main surface of heat transfer suppression member 40 is in contact with exterior can 18, and the other main surface of heat transfer suppression member 40 is in contact with insulating film 42. For example, heat transfer suppression member 40 is attached to one main surface 18a of exterior can 18 before exterior can 18 is stored in insulating film 42. Exterior can 18 and heat transfer suppression member 40 are stored in insulating film 42 together. Then, heat transfer suppression member 40 can be disposed between exterior can 18 and insulating film 42 by contracting insulating film 42.

A heat insulating material of which heat transfer suppression member 40 is made has a structure such that a porous material such as silica xerogel is held between fibers of a fiber sheet made of non-woven fabric or the like. Silica xerogel has a nano-size void structure that regulates movement of air molecules and has low heat conductivity. Heat conductivity of the heat insulating material is approximately 0.018 W/m·K to 0.024 W/m·K. The heat insulating material is useful especially as a heat insulating material used in a narrow space. The heat conductivity of the heat insulating material is lower than heat conductivity of air. Accordingly, presence of heat transfer suppression member 40 provided in battery module 1 can keep heat transfer between batteries 12 smaller than a case where an air layer is provided as a heat insulating layer between batteries 12. Furthermore, the heat conductivity of heat transfer suppression member 40 is much lower than heat conductivity of separator 14.

Silica xerogel can stably maintain the structure against pressure from an outside. This makes it possible to stably maintain heat insulating performance of the heat insulating material irrespective of tightening in stacking direction X by restraint member 6. Accordingly, presence of heat transfer suppression member 40 provided in battery module 1 can more stably suppress heat transfer between batteries 12 than a case where an air layer is provided as a heat insulating layer between batteries 12. Furthermore, since the heat insulating material has lower heat conductivity than air, a similar heat insulating effect can be obtained with a thickness smaller than an air layer. It is therefore possible to suppress an increase in size of battery module 1.

Insulating film 42 also functions as a laminate film that wraps up the heat insulating material so as to protect the heat insulating material. Insulating film 42 keeps the porous material in the heat insulating material from being detached from the fiber sheet. Furthermore, insulating film 42 also functions as a member for fixing heat transfer suppression member 40.

Heat transfer suppression member 40 has higher heat resistance than separator 14. More specifically, the fiber sheet includes fibers that have a higher melting point than separator 14 and/or the porous material is made of a substance that has a higher melting point than separator 14. For example, heat transfer suppression member 40 has a melting point of 300° C. or higher. Specifically, the fiber sheet and/or the porous material that constitute the heat insulating material have a melting point of 300° C. or higher. In particular, the fibers that constitute the fiber sheet preferably have a melting point of 300° C. or higher. This makes it possible to maintain a state where the porous material is held by the fiber sheet even in a case where the heat insulating material is exposed to a high temperature. As described above, by making the heat resistance of heat transfer suppression member 40 higher than the heat resistance of separator 14, it is possible to leave heat transfer suppression member 40 even in a case where separator 14 melts due to heat generated by battery 12. Accordingly, insulation between batteries 12 can be maintained by heat transfer suppression member 40 even in a case where separator 14 melts. Furthermore, a state where heat transfer between adjacent batteries 12 is suppressed can be maintained for a longer period.

The plurality of batteries 12 are disposed so that main surfaces of adjacent batteries 12 face each other and output terminals 22 face in the same direction (for convenience of description, upward in a vertical direction in this example). As described above, two adjacent batteries 12 are arrayed such that positive electrode terminal 22a of one battery 12 is adjacent to negative electrode terminal 22b of other battery 12. Two adjacent batteries 12 may be arrayed such that positive electrode terminal 22a of one battery 12 is adjacent to positive electrode terminal 22a of other battery 12. For example, if two adjacent batteries 12 are in parallel connection, batteries 12 are arrayed such that output terminals 22 of an identical polarity are adjacent to each other.

Figure 15:
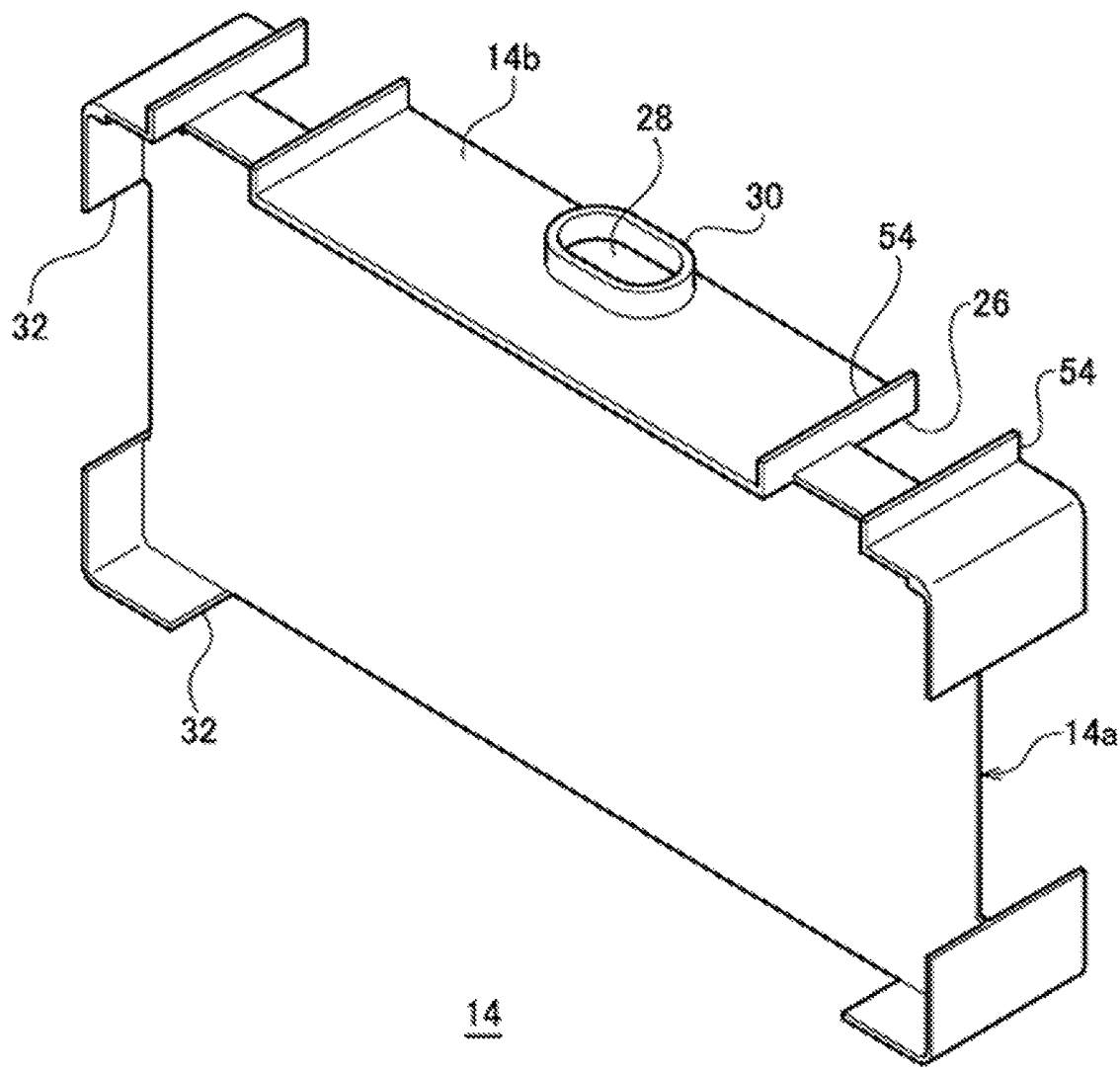
FIG. 15 is a schematic perspective view illustrating a structure of a separator in the fourth aspect of the present invention.

FIG. 15 is a schematic perspective view illustrating a structure of separator 14. Separator 14 has plane 14a parallel to the main surface of battery 12 and wall 14b extending from an edge of plane 14a in stacking direction X in which batteries 12 are stacked. Since plane 14a extends between the main surfaces of adjacent batteries 12, exterior cans 18 of adjacent batteries 12 are insulated from each other. Further, since plane 14a extends between battery 12 and end plate 4, exterior can 18 of battery 12 and end plate 4 are insulated from each other.

Top surface n, the bottom surface, and the side surfaces of battery 12 are covered with wall 14b. This can suppress a short circuit between adjacent batteries 12 or between battery 12 and end plate 4, which can be caused by, for example, dew condensation on a surface of battery 12 or end plate 4. In other words, a creepage distance between adjacent batteries 12 or between battery 12 and end plate 4 can be secured by wall 14b. In particular, wall 14b covers top surface n of battery 12, whereby the above-described short circuit can be further suppressed. In the present exemplary embodiment, a tip of wall 14b of one of two adjacent separators 14 abuts on a tip of wall 14b of other separator 14. Therefore, battery 12 is housed in a space formed by plane 14a and wall 14b. In the present exemplary embodiment, separator 14 holds battery 12 by way of wall 14b.

Wall 14b has cutout 26 at a position corresponding to output terminal 22 to expose output terminal 22 to the outside. Wall 14b also has opening 28 at a position corresponding to valve 24 to expose valve 24 to the outside. An edge of opening 28 is provided with barrier 30 projecting from a surface of wall 14b toward covering 8. Barrier 30 surrounds an entire circumference of opening 28. Wall 14b has cutout 32 at positions corresponding to the side surfaces and bottom surface of battery 12 to expose parts of the side surfaces and bottom surface of battery 12. A heatsink (not illustrated) is thermally connected to the side surfaces and/or the bottom surface of battery 12. Heat generated in battery 12 is released mainly through the heatsink. In assembled battery module 1, wall 14b is positioned between restraint member 6 and battery 12. This configuration prevents restraint member 6 and battery 12 from coming into contact with each other.

Separator 14 has support 54 projecting toward covering 8 and supporting covering 8 in assembled battery module 1. Support 54 is disposed on wall 14b covering top surface n of battery 12. In the present exemplary embodiment, a pair of supports 54 is disposed at both ends of cutout 26. Supports 54, which face each other through cutout 26 and are arrayed in direction Y perpendicular to stacking direction X, put a bus bar into an installation position. The bus bar is disposed between the pair of supports 54.

Figure 16:
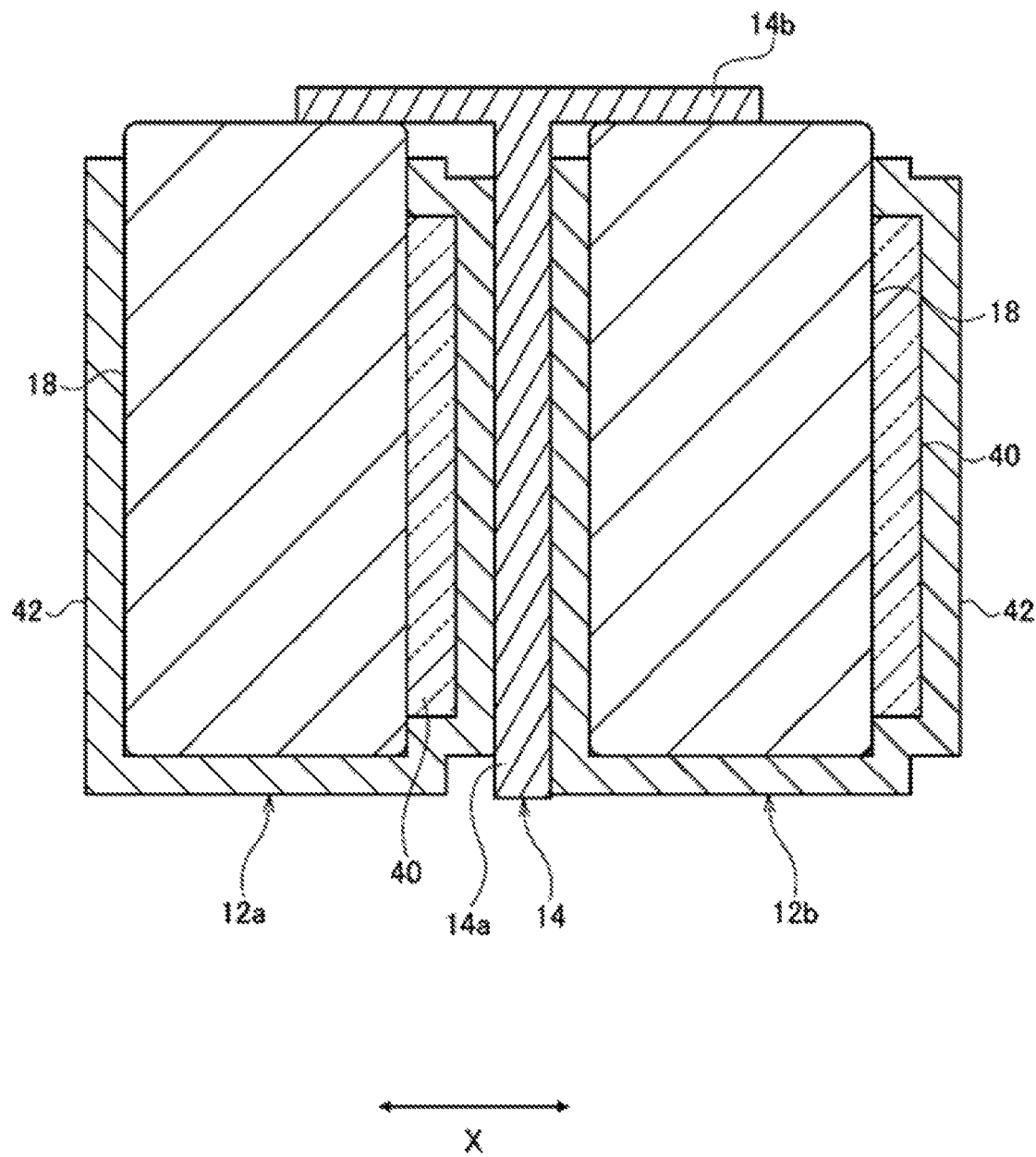
FIG. 16 is a cross-sectional view schematically illustrating a structure in which a battery and a separator are stacked in the fourth aspect of the present invention.

FIG. 16 is a cross-sectional view schematically illustrating a structure in which a battery and a separator are stacked. FIG. 16 illustrates any two batteries 12 (hereinafter referred to as battery 12a and battery 12b in a case where these two batteries 12 are distinguished from each other) and separator 14 disposed between these two batteries 12. FIG. 5 illustrates a cross section extending in stacking direction X. In FIG. 16, illustration of an internal structure of battery 12 is omitted.

In assembled battery module 1, two adjacent batteries 12a and 12b are disposed so that a main surface of one battery 12a on which heat transfer suppression member 40 is stacked and a main surface of other battery 12b on which heat transfer suppression member 40 is not stacked face each other. Accordingly, heat transfer suppression member 40 is disposed between two adjacent batteries 12. More specifically, battery module 1 has a structure in which exterior can 18 of battery 12a, heat transfer suppression member 40, insulating film 42, plane 14a of separator 14, insulating film 42 of battery 12b, and exterior can 18 are arranged in this order. Heat transfer suppression member 40 is not interposed between plane 14a and exterior can 18 of battery 12b. That is, single heat transfer suppression member 40 is interposed between battery 12a and battery 12b. This makes it possible to suppress heat transfer between battery 12a and battery 12b and suppress an increase in size of battery module 1.

As described above, battery 12 according to the present exemplary embodiment includes exterior can 18, insulating film 42 that coats a surface of exterior can 18, and heat transfer suppression member 40 disposed between exterior can 18 and insulating film 42. Accordingly, in a case where battery module 1 is formed by stacking a plurality of batteries 12, heat transfer suppression member 40 is disposed between two adjacent batteries 12. With this configuration, even in a case where a temperature of any battery 12 rises excessively during use of battery module 1, it is possible to keep heat of this battery 12 from transferring to adjacent battery 12. This makes it possible to suppress a cycle of overheat, thereby avoiding a decrease in performance of battery module 1. According to battery 12 and battery module 1 according to the present exemplary embodiment, a cycle of thermal runaway can be suppressed even in a case where thermal runaway of battery 12 occurs.

According to battery 12 according to the present exemplary embodiment, heat transfer suppression member 40 is coated with insulating film 42. This makes it possible to prevent deviation of heat transfer suppression member 40. This can suppress a decrease in performance of the battery module with more certainty.

Heat transfer suppression member 40 has higher heat resistance than separator 14. Accordingly, insulation between batteries 12 can be maintained even in a case where separator 14 melts due to heat generated by battery 12. Furthermore, heat transfer between batteries 12 can be suppressed for a longer period.

Heat transfer suppression member 40 may be disposed on both surfaces of exterior can 18. In a case where heat transfer suppression member 40 is disposed on both surfaces of exterior can 18, two heat transfer suppression members 40 are interposed between adjacent batteries 12. For this reason, a thickness of each heat transfer suppression member 40 may be smaller than, for example, half of a thickness of heat transfer suppression member 40 used in a case where heat transfer suppression member 40 is provided only on a single surface of battery 12. This makes it possible to insulate adjacent batteries 12 from each other and suppress an increase in size of battery module 1 caused by heat transfer suppression members 40.

Second Exemplary Embodiment

Figure 17:
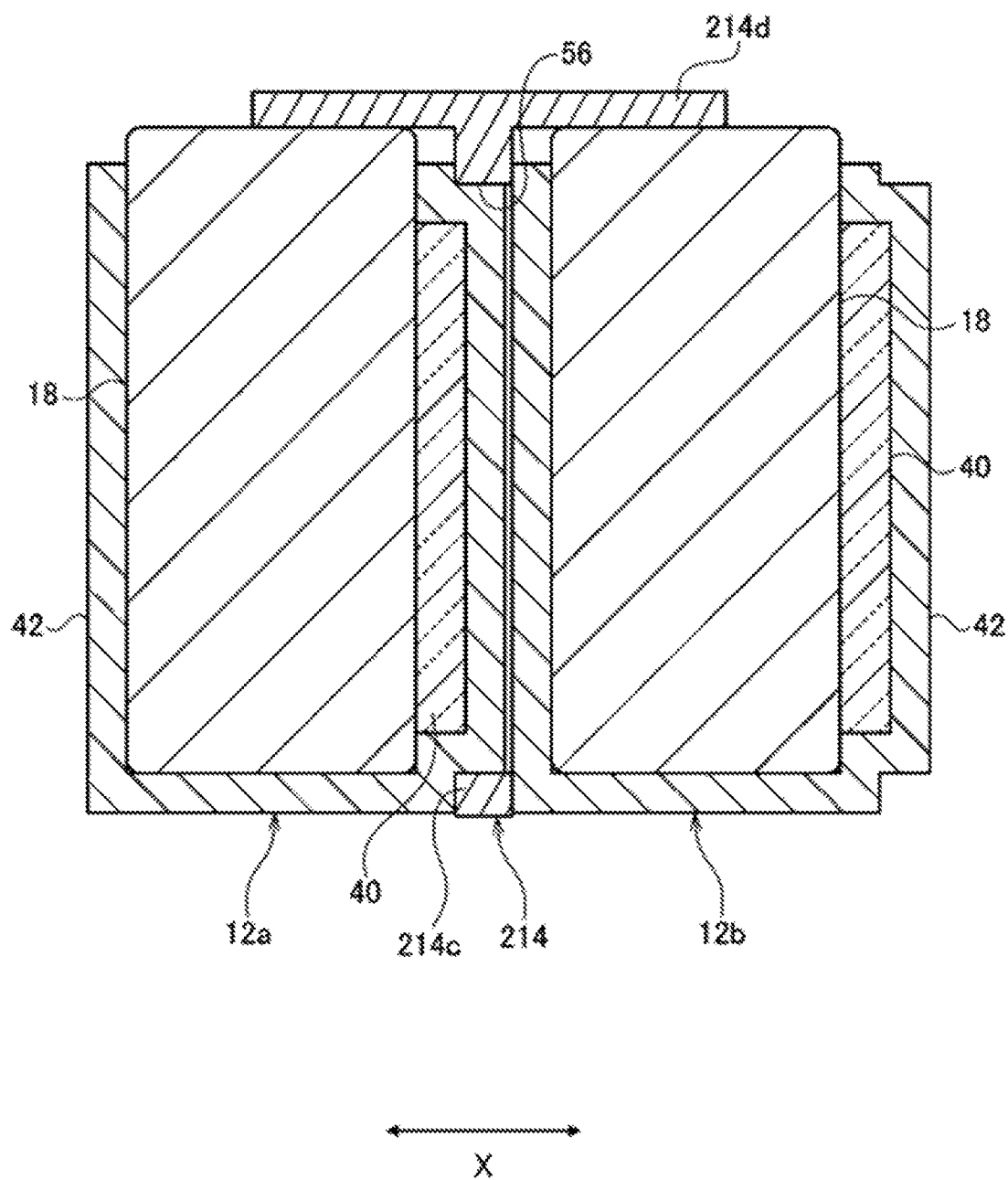
FIG. 17 is a cross-sectional view schematically illustrating a structure in which a battery and a separator in a battery module according to the second exemplary embodiment are stacked in the fourth aspect of the present invention.

In the fourth aspect of the present invention, a battery module according to a second exemplary embodiment shares a configuration with the battery module of the first exemplary embodiment except for a dissimilarity in separator shape. The following description of the battery module according to the present exemplary embodiment is primarily given on differences between the first and second exemplary embodiments, and redundant descriptions of shared elements are omitted or simplified. FIG. 17 is a cross-sectional view schematically illustrating a structure in which a battery and a separator in a battery module according to the second exemplary embodiment are stacked. FIG. 17 illustrates any two batteries 12 (hereinafter referred to as battery 12a and battery 12b in a case where these two batteries 12 are distinguished from each other) and separator 214 disposed between these two batteries 12. FIG. 17 illustrates a cross section extending in stacking direction X. In FIG. 17, illustration of an internal structure of battery 12 is omitted.

Separator 214 included in the battery module according to the present exemplary embodiment includes first part 214c that corresponds to plane 14a of separator 14 and second part 214d that corresponds to wall 14b according to the first exemplary embodiment. First part 214c has a structure identical to plane 14a except for that first part 214c has through-hole 56. Second part 214d has a structure identical to wall 14b.

Separator 214 has through-hole 56. Through-hole 56 is disposed in first part 214c. Accordingly, through-hole 56 is disposed in a region that overlaps batteries 12 when viewed from stacking direction X in which batteries 12 are stacked. Through-hole 56 passes through first part 214c of separator 214 in stacking direction X. Through-hole 56 has a substantially rectangular opening shape and is disposed in a substantially central part of first part 214c. Accordingly, first part 214c has a frame shape.

In the assembled battery module, part of battery 12 is stored in through-hole 56. Battery 12 has, on a main surface, a bulging part that is formed because heat transfer suppression member 40 is stored in insulating film 42. This bulging part is constituted by heat transfer suppression member 40 and a part of insulating film 42 that coats heat transfer suppression member 40. In the present exemplary embodiment, a projected area of this bulging part in stacking direction X is equal to or smaller than an opening area of through-hole 56. Accordingly, the bulging part of battery 12a that faces separator 214 side is inserted into through-hole 56. Accordingly, heat transfer suppression member 40 is disposed inside through-hole 56 when viewed from stacking direction X. Preferably, at least part of heat transfer suppression member 40 is stored in through-hole 56 when viewed from direction Y orthogonal to stacking direction X.

The battery module according to the present exemplary embodiment can produce effects similar to those in the first exemplary embodiment. In the present exemplary embodiment, separator 214 has through-hole 56, and part of battery 12 is stored in through-hole 56. This suppresses an increase in size of battery module 1 caused by presence of heat transfer suppression member 40. Furthermore, it is possible to prevent deviation of heat transfer suppression member 40. Furthermore, through-hole 56 can be used to determine a position of battery 12. This makes it possible to heighten ease of assembling of the battery module. Furthermore, a space in which at least part of heat transfer suppression member 40 is stored can be provided by through-hole 56. This keeps heat transfer suppression member 40 from being excessively pressed.

Especially in cases such as a case where heat transfer suppression member 40 includes a fiber sheet, heat transfer suppression member 40 is easy to be elastically deformed. When the plurality of batteries 12 are fastened in stacking direction X by restraint member 6, heat transfer suppression member 40 can also be compressed by this fastening. Meanwhile, presence of through-hole 56 can suppress a change in dimension of heat transfer suppression member 40. Heat insulating performance of heat transfer suppression member 40 depends on heat conductivity of a material of which heat transfer suppression member 40 is made and a thickness of heat transfer suppression member 40. Presence of through-hole 56 makes it possible to obtain heat insulating performance of heat transfer suppression member 40 with more certainty. Through-hole 56 preferably has a depth equal to or larger than a thickness of heat transfer suppression member 40 necessary for obtaining predetermined heat insulating performance.

Figure 18:
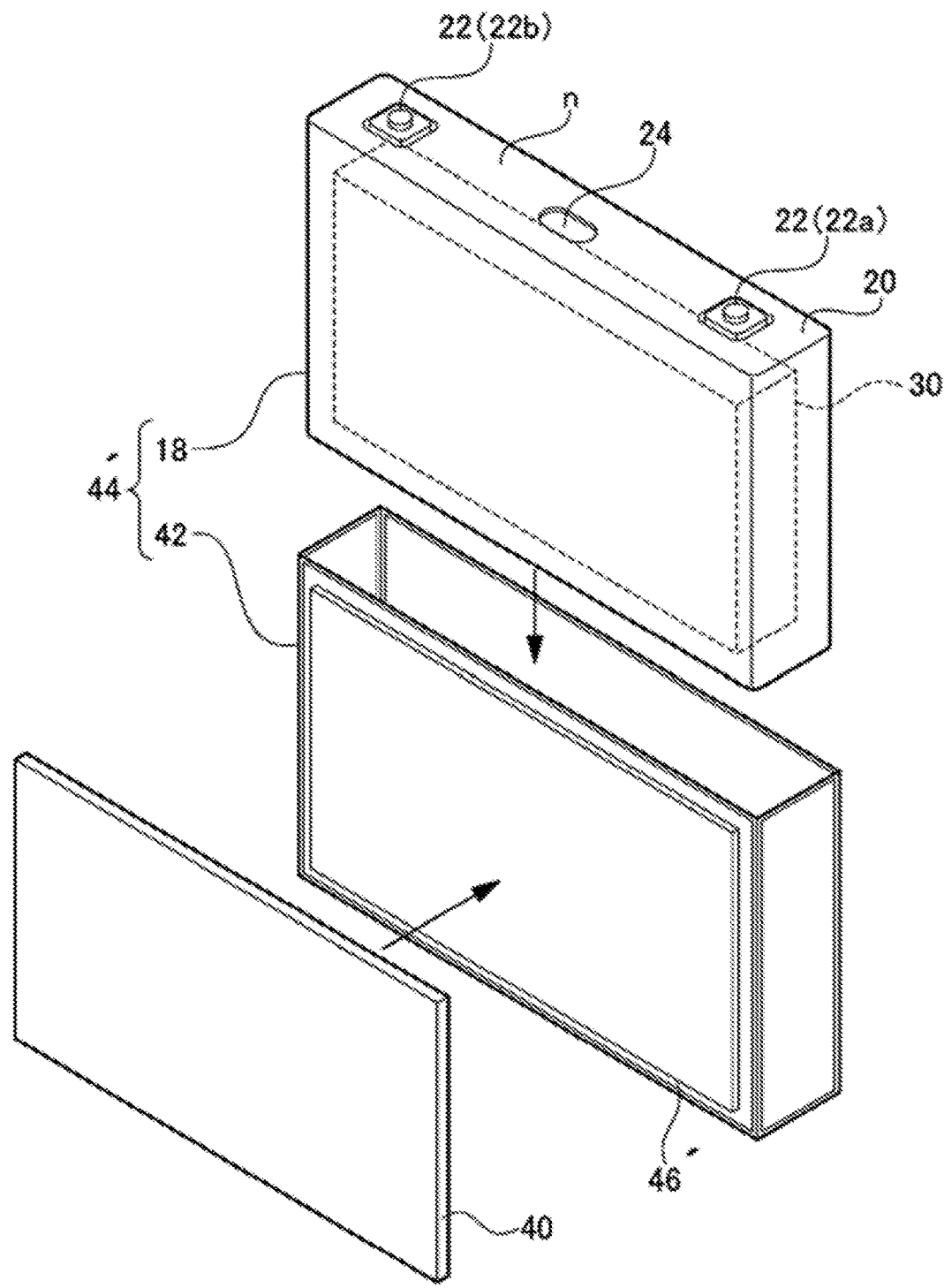
FIG. 18 is a schematic exploded perspective view illustrating a structure of a battery in a fifth aspect of the present invention.
Figure 19A:
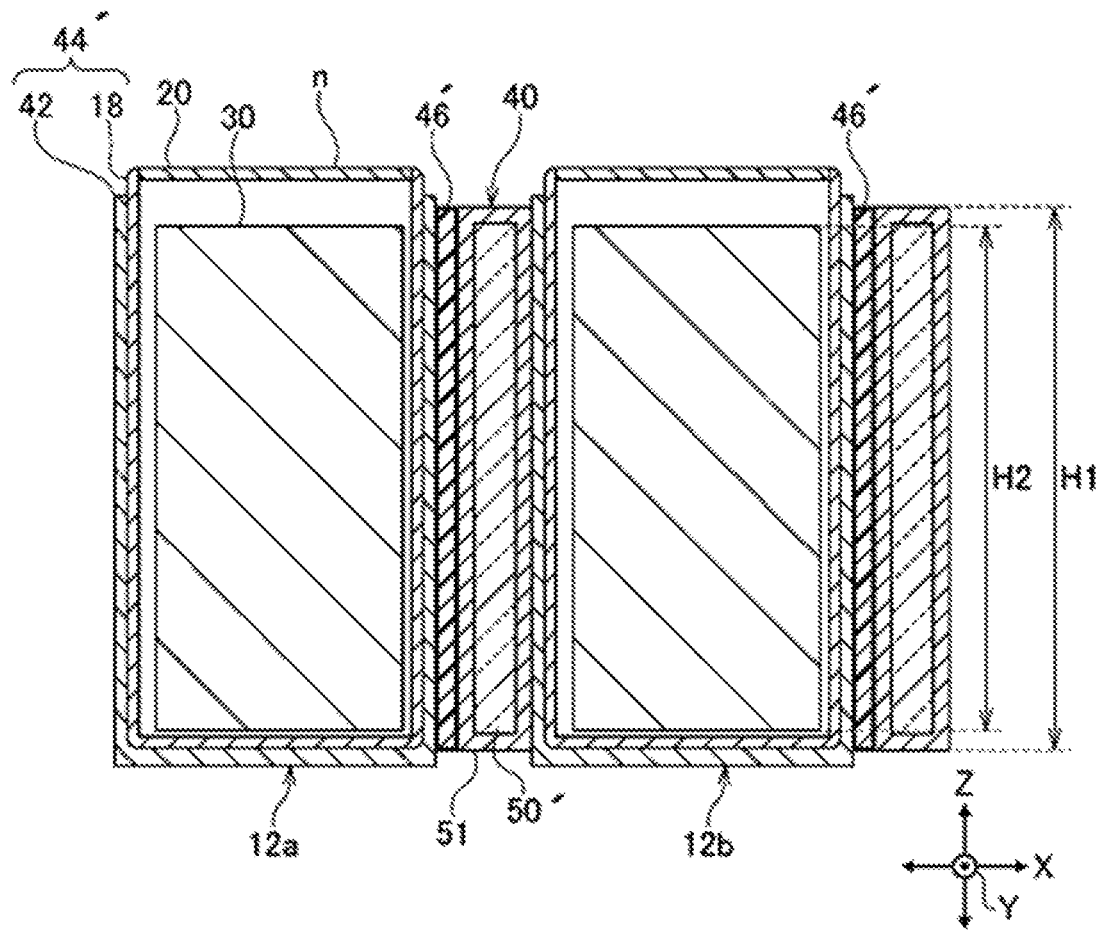
FIG. 19A is a cross-sectional view schematically illustrating a state where batteries are stacked in the fifth aspect of the present invention.
Figure 19B:
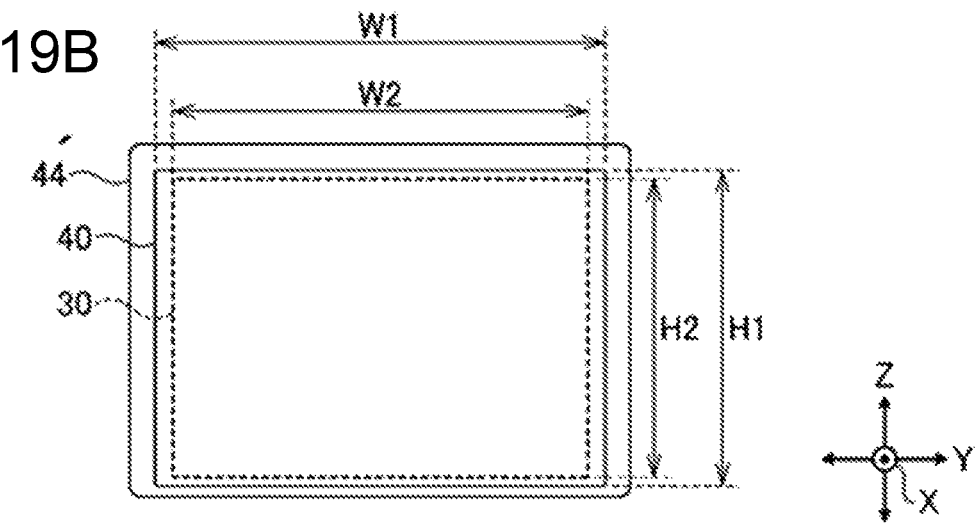
FIG. 19B is a front view schematically illustrating a way in which a heat transfer suppression member is disposed in a battery.

A structure of battery 12 according to a fifth aspect of the present invention is described in detail below. FIG. 18 is a schematic exploded perspective view illustrating a structure of battery 12. FIG. 19A is a cross-sectional view schematically illustrating a state where batteries 12 are stacked. FIG. 19B is a front view schematically illustrating a way in which heat transfer suppression member 40 is disposed in battery 12. FIG. 19A illustrates any two batteries 12 (hereinafter referred to as battery 12a and battery 12b in a case where these two batteries 12 are distinguished from each other). FIG. 19A illustrates a cross section extending in stacking direction X.

Battery 12 has exterior can 18 with a flat rectangular parallelepiped shape. A substantially rectangular opening is provided in one surface of exterior can 18, and electrode assembly 30, an electrolyte, and the like are put into exterior can 18 through this opening. Electrode assembly 30 has, for example, a structure in which positive and negative electrodes are wound spirally. The opening of exterior can 18 is provided with sealing plate 20 to block the opening and seal an inside of exterior can 18. Sealing plate 20 has positive electrode terminal 22a near one end in a longitudinal direction and negative electrode terminal 22b near another end in the longitudinal direction. Sealing plate 20 and output terminals 22 constitute a sealing body. Exterior can 18 and sealing plate 20 are each formed from a metal. Typically, exterior can 18 and sealing plate 20 are each formed from a metal such as aluminum or an aluminum alloy. Output terminal 22 is formed from a metal having electrical conductivity.

In the present exemplary embodiment, a side provided with the sealing body serves as top surface n of battery 12, and an opposite side serves as a bottom surface of battery 12. Further, battery 12 has two main surfaces connecting top surface n and the bottom surface. This main surface is a surface having a largest area among six surfaces of battery 12. Remaining two surfaces excluding top surface n, the bottom surface, and the two main surfaces serve as side surfaces of battery 12. A top surface n side of batteries 12 serves as a top surface of battery assembly 2, and a bottom surface side of batteries 12 serves as a bottom surface of battery assembly 2.

Battery 12 has valve 24 on a surface to release gas produced inside battery 12. In the present exemplary embodiment, battery 12 has valve 24 on top surface n facing covering 8. Valve 24 is disposed between a pair of output terminals 22 of sealing plate 20. Specifically, valve 24 is disposed substantially at a center of sealing plate 20 in the longitudinal direction. Valve 24 can be opened to release internal gas when internal pressure of exterior can 18 rises to a predetermined value or more. Valve 24 is also called a safety valve or a vent.

Furthermore, battery 12 has insulating film 42. Insulating film 42 is, for example, a shrink tube and is heated after exterior can 18 is stored in insulating film 42. As a result, insulating film 42 shrinks and coats a surface of exterior can 18. Short circuit between adjacent batteries 12 can be suppressed by insulating film 42. Exterior can 18 and insulating film 42 constitute housing 44'.

Furthermore, battery 12 includes adhesive layer 46' and heat transfer suppression member 40. Adhesive layer 46' is stacked on a surface of housing 44'. More specifically, adhesive layer 46' is stacked on one main surface of housing 44'. Adhesive layer 46' is made of a conventionally known adhesive. Adhesive layer 46' may be stacked on a surface of heat transfer suppression member 40.

Heat transfer suppression member 40 is fixed to housing 44' with adhesive layer 46' interposed therebetween. Accordingly, heat transfer suppression member 40 is disposed on one main surface of housing 44'. Heat transfer suppression member 40 is disposed between two adjacent batteries 12 so that heat transfer between two batteries 12 is suppressed. Heat transfer suppression member 40 has an insulating property and insulates two batteries 12 from each other. Heat transfer suppression member 40 has a rectangular sheet shape and has heat insulating material 50' and laminate film 51. A thickness of heat transfer suppression member 40 is, for example, 1 mm to 2 mm.

Heat insulating material 50' has a structure such that a porous material such as silica xerogel is held between fibers of a fiber sheet made of non-woven fabric or the like. Silica xerogel has a nano-size void structure that regulates movement of air molecules and has low heat conductivity. Heat conductivity of heat insulating material 50' is approximately 0.018 W/m·K to 0.024 W/m·K. Heat insulating material 50' is useful especially as a heat insulating material used in a narrow space. The heat conductivity of heat insulating material 50' is lower than heat conductivity of air. Accordingly, presence of heat transfer suppression member 40 provided in battery module 1 can keep heat transfer between batteries 12 smaller than a case where an air layer is provided as a heat insulating layer between batteries 12. Heat conductivity of heat transfer suppression member 40 is much lower than heat conductivity of a conventionally known separator made of a thermoplastic resin such as polypropylene (PP) or polybutylene terephthalate (PBT).

Silica xerogel can stably maintain the structure against pressure from an outside. This makes it possible to stably maintain heat insulating performance of heat insulating material 50' irrespective of tightening in stacking direction X by restraint member 6. Accordingly, presence of heat transfer suppression member 40 provided in battery module 1 can more stably suppress heat transfer between batteries 12 than a case where an air layer is provided as a heat insulating layer between batteries 12. Furthermore, since heat insulating material 50' has lower heat conductivity than air, a similar heat insulating effect can be obtained with a thickness smaller than an air layer. It is therefore possible to suppress an increase in size of battery module 1.

Laminate film 51 is a member that wraps up whole heat insulating material 50' so as to protect heat insulating material 50'. That is, the porous material and the fiber sheet are wrapped up by laminate film 51. Laminate film 51 keeps the porous material in heat insulating material 50' from being detached from the fiber sheet. Furthermore, heat transfer suppression member 40 can be easily adhered to housing 44' since heat transfer suppression member 40 has a structure such that heat insulating material 50' is coated with laminate film 51. Laminate film 51 is, for example, made of polyethylene terephthalate (PET).

Heat transfer suppression member 40 has higher heat resistance than the aforementioned conventionally known separator. More specifically, heat resistance of heat insulating material 50' is higher than heat resistance of the separator. More specifically, the fiber sheet includes fibers that have a higher melting point than the separator and/or the porous material is made of a substance that has a higher melting point than the separator. For example, heat insulating material 50' has a melting point of 300° C. or higher. Specifically, the fiber sheet and/or the porous material that constitute heat insulating material 50' have a melting point of 300° C. or higher. In particular, the fibers that constitute the fiber sheet preferably have a melting point of 300° C. or higher. This makes it possible to maintain a state where the porous material is held by the fiber sheet even in a case where heat insulating material 50' is exposed to a high temperature.

Heat transfer suppression member 40 has elasticity mainly resulting from the fiber sheet of heat insulating material 50'. Accordingly, heat transfer suppression member 40 is elastically deformed by being compressed in stacking direction X in assembled battery module 1.

Battery 12 is assembled as follows, for example. Specifically, first, electrode assembly 30, an electrolyte, and the like are stored in exterior can 18, and sealing plate 20 is fitted in exterior can 18. Next, exterior can 18 is stored in insulating film 42, and insulating film 42 is contracted, for example, by heating. Subsequently, an adhesive is applied to a main surface of insulating film 42, and thus adhesive layer 46' is formed. Then, heat transfer suppression member 40 is attached to adhesive layer 46'. In this way, battery 12 is obtained. Note that it is also possible to form adhesive layer 46' by applying an adhesive on a main surface of heat transfer suppression member 40 and attach an assembly of heat transfer suppression member 40 and adhesive layer 46' to a main surface of insulating film 42 coating exterior can 18.

In assembled battery module 1, two adjacent batteries 12a and 12b are disposed so that a main surface of one battery 12a on which heat transfer suppression member 40 is stacked and a main surface of other battery 12b on which heat transfer suppression member 40 is not stacked face each other. Accordingly, heat transfer suppression member 40 is disposed between two adjacent batteries 12. More specifically, battery module 1 has a structure in which housing 44' of battery 12a, adhesive layer 46', heat transfer suppression member 40, and housing 44' of battery 12b are arranged in this order.

Heat transfer suppression member 40 included in battery 12a that is one of two adjacent batteries 12a and 12b is in direct contact with housing 44' of other battery 12b. That is, battery module 1 does not include a conventionally known separator. Heat transfer suppression member 40 of battery 12a and housing 44' of battery 12b may be in contact with each other with another adhesive layer interposed therebetween.

Heat transfer suppression member 40 covers whole electrode assembly 30 when viewed from a direction (identical to stacking direction X in which batteries 12 are stacked) in which housing 44' and heat transfer suppression member 40 are stacked. That is, height H1 of heat transfer suppression member 40 is larger than height H2 of electrode assembly 30. Width W1 of heat transfer suppression member 40 is larger than width W2 of electrode assembly 30. Heat transfer suppression member 40 is disposed so that a center of heat transfer suppression member 40 almost matches a center of electrode assembly 30. More preferably, a size and a position of heat transfer suppression member 40 are determined so that heat insulating material 50' covers whole electrode assembly 30.

Note that preferably, heat transfer suppression member 40 is not interposed between end plate 4 and battery 12 adjacent to this end plate 4. This can avoid hindrance of heat release from battery 12 through end plate 4.

As described above, battery 12 according to the present exemplary embodiment includes housing 44', adhesive layer 46' stacked on a surface of housing 44', and heat transfer suppression member 40 fixed to housing 44' with adhesive layer 46' interposed therebetween. In a case where battery module 1 is formed by stacking a plurality of batteries 12, heat transfer suppression member 40 is disposed between two adjacent batteries 12 in battery module 1. With this configuration, even in a case where a temperature of any battery 12 rises excessively during use of battery module 1, it is possible to keep heat of this battery 12 from transferring to adjacent battery 12. This makes it possible to suppress a cycle of overheat, thereby avoiding a decrease in performance of battery module 1. According to battery 12 and battery module 1 according to the present exemplary embodiment, a cycle of thermal runaway can be suppressed even in a case where thermal runaway of battery 12 occurs.

Heat transfer suppression member 40 covers whole electrode assembly 30 when viewed from stacking direction X in which housing 44' and heat transfer suppression member 40 are stacked. Expansion of battery 12 that can occur during use of battery module 1 is caused mainly by expansion of an active material contained in electrode assembly 30. That is, a part where electrode assembly 30 extends in battery 12 is easier to expand. Meanwhile, by disposing heat transfer suppression member 40 so that heat transfer suppression member 40 covers whole electrode assembly 30 when viewed from stacking direction X, it is possible to prevent contact between housings 44' of adjacent batteries 12a and 12b with more certainty. It is therefore possible to suppress short circuit and heat transfer between adjacent batteries 12a and 12b.

Heat transfer suppression member 40 included in battery 12a that is one of two adjacent batteries 12a and 12b is in direct contact with housing 44' of other battery 12b. This makes it possible to reduce a manufacturing cost and a number of steps as compared with a case where another adhesive layer is provided between heat transfer suppression member 40 of battery 12a and housing 44' of battery 12b. Since a conventionally known separator is not interposed between two adjacent batteries 12a and 12b, it is possible to reduce a number of components of battery module 1 and reduce a size of battery module 1. Note that in a case where heat transfer suppression member 40 of battery 12a and housing 44' of battery 12b abut on each other with another adhesive layer interposed therebetween, an assembling strength of battery assembly 2 can be further increased.

In battery 12 according to the present exemplary embodiment, heat transfer suppression member 40 is fixed to housing 44' with adhesive layer 46' interposed therebetween. This makes it possible to prevent deviation of heat transfer suppression member 40. It is therefore possible to suppress a decrease in performance of battery module 1 with more certainty.

Heat transfer suppression member 40 has higher heat resistance than a conventionally known separator. This makes it possible to maintain insulation between batteries 12 with more certainty than a case where adjacent batteries 12 are insulated from each other by a conventionally known separator.

Second Exemplary Embodiment

Figure 20A:
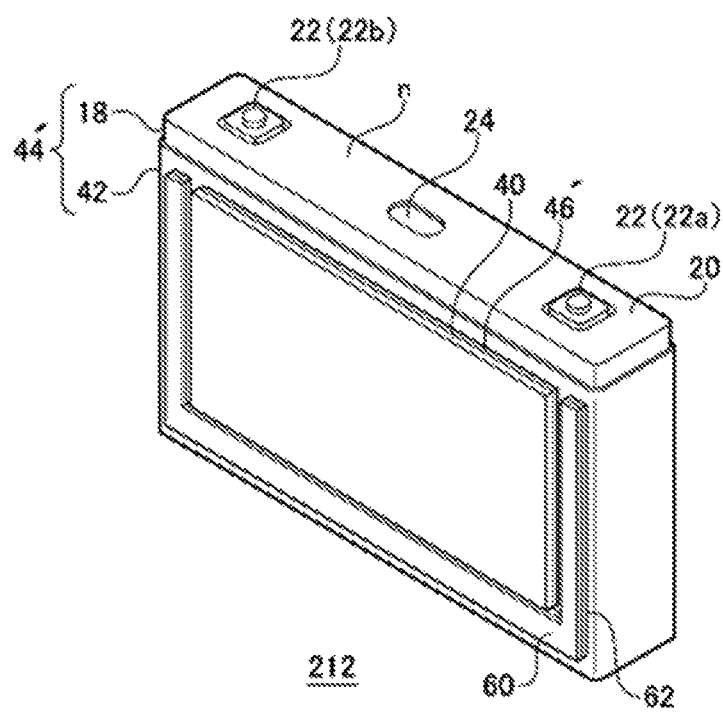
FIG. 20A is a schematic perspective view illustrating a structure of a battery according to a second exemplary embodiment in the fifth aspect of the present invention.
Figure 20B:
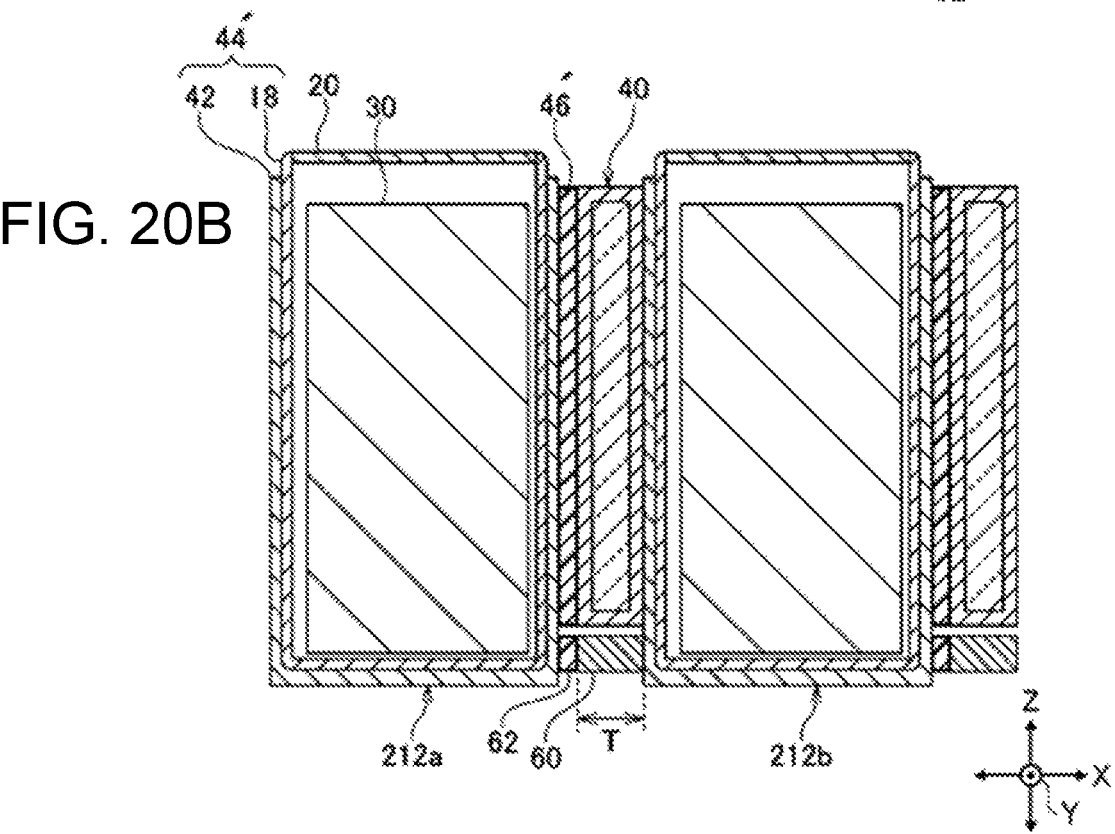
FIG. 20B is a cross-sectional view schematically illustrating a state where batteries are stacked.

In the fifth aspect of the present invention, a battery module according to a second exemplary embodiment shares a configuration with the battery module of the first exemplary embodiment except for that the battery module according to the second exemplary embodiment includes a spacer. The following description of the battery module according to the present exemplary embodiment is primarily given on differences between the first and second exemplary embodiments, and redundant descriptions of shared elements are omitted or simplified. FIG. 20A is a schematic perspective view illustrating a structure of a battery according to the second exemplary embodiment. FIG. 20B is a cross-sectional view schematically illustrating a state where batteries are stacked. Any two batteries are illustrated in FIG. 20B. FIG. 20B illustrates a cross section extending in stacking direction X.

Battery 212 according to the present exemplary embodiment includes spacer 60. Spacer 60 is a member that is disposed between two adjacent batteries 212a and 212b so as to secure a distance between two adjacent batteries 212a and 212b. Spacer 60 according to the present exemplary embodiment is fixed to a main surface (a first surface) of housing 44' on which heat transfer suppression member 40 is fixed. Spacer 60 is disposed in a region of the main surface in which heat transfer suppression member 40 does not extend. Spacer 60 is, for example, fixed to housing 44' with adhesive layer 62 interposed therebetween. Adhesive layer 62 is made of a conventionally known adhesive.

Spacer 60 is made of any insulating material such as rubber or a resin. Spacer 60 is a member that has higher rigidity than heat transfer suppression member 40. Examples of a material of which spacer 60 is made include resin materials such as polybutylene terephthalate (PBT), polypropylene (PP), polycarbonate (PC), and polyethylene terephthalate (PET) and rubber materials such as urethane rubber, silicon rubber, and fluorine-containing rubber. Thickness T (i.e., a length in stacking direction X) of spacer 60 is smaller than a thickness of heat transfer suppression member 40 that is not compressed in stacking direction X. When stacked batteries 212a and 212b are fastened by restraint member 6, heat transfer suppression member 40 is compressed in stacking direction X so as to be elastically deformed. Housings 44' of two batteries 212a and 212b approach each other as a result of deformation of heat transfer suppression member 40, but further approach of housings 44' is suppressed when spacer 60 of battery 212a makes contact with housing 44' of battery 212b as illustrated in FIG. 20B. As a result, at least a distance corresponding to thickness T of spacer 60 is secured between two housings 44'. Note that adhesive layer 46', 62 is set to have a thickness that can be ignored.

Presence of spacer 60 can determine a distance between housings 44' of adjacent batteries 212a and 212b, thereby suppressing heat transfer and contact between the batteries with more certainty. Furthermore, it is possible to secure a space in which heat transfer suppression member 40 extends. This keeps heat transfer suppression member 40 from being excessively pressed. Heat insulating performance of heat transfer suppression member 40 depends on heat conductivity of a material of which heat transfer suppression member 40 is made and a thickness of heat transfer suppression member 40. Presence of spacer 60 suppresses a change in dimension of heat transfer suppression member 40, thereby making it possible to secure heat insulating performance of heat transfer suppression member 40 with more certainty.

By designing battery module 1 so that heat transfer suppression member 40 is compressed in assembled battery module 1, expansion of battery 212 can be suppressed by utilizing stress occurring in heat transfer suppression member 40. By suppressing expansion of battery 212, it is possible to suppress a decrease in performance of battery 212 and heat transfer and contact between adjacent batteries.

Spacer 60 has a substantially U shape and extends along a bottom edge and both side edges of heat transfer suppression member 40 that has a quadrangular shape. That is, the bottom edge and both side edges of heat transfer suppression member 40 are surrounded by spacer 60, but an upper edge of heat transfer suppression member 40 is open to an outside. The bottom edge of heat transfer suppression member 40 is an edge extending along a bottom surface of battery 212, the side edges of heat transfer suppression member 40 are edges extending along a side surface of battery 212, and the upper edge of heat transfer suppression member 40 is an edge extending along top surface n of battery 212, i.e., an opening of exterior can 18. By disposing spacer 60 so that spacer 60 surrounds edges other than the upper edge of heat transfer suppression member 40 without disposing spacer 60 close to the upper edge of heat transfer suppression member 40, it is possible to keep force from being applied to sealing plate 20 due to spacer 60 during fastening by restraint member 6. This makes it possible to keep sealing plate 20 from being detached from exterior can 18. Spacer 60 may be fixed to a main surface (a second surface) that is opposite to a main surface on which heat transfer suppression member 40 is fixed. In this case, spacer 60 is disposed so as to surround edges other than the upper edge of heat transfer suppression member 40 included in adjacent battery 212.

Third Exemplary Embodiment

Figure 21A:
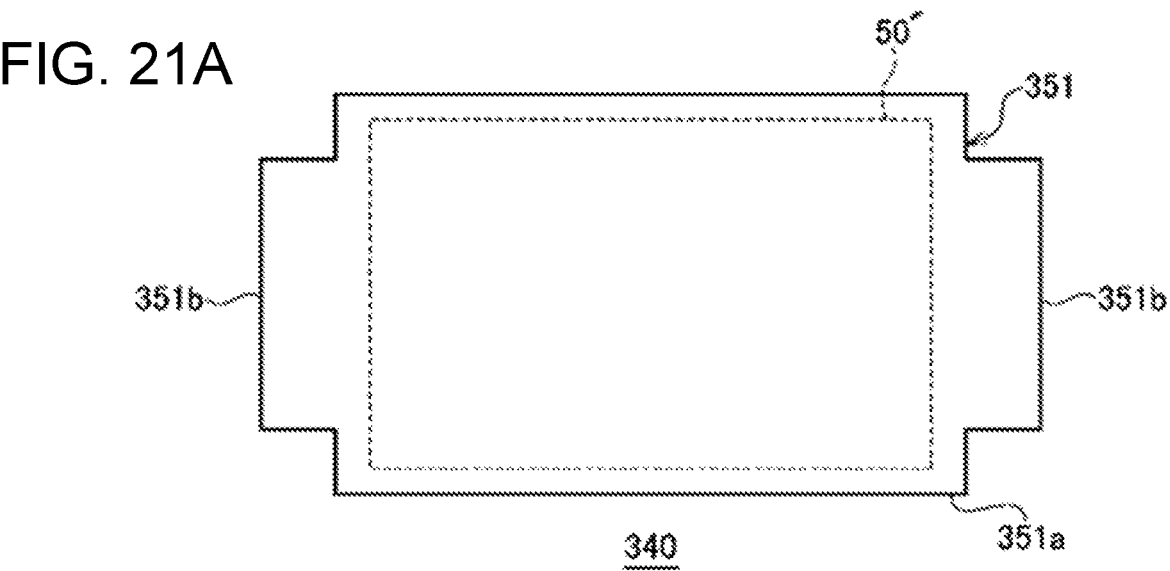
FIG. 21A is a front view schematically illustrating a heat transfer suppression member included in a battery according to a third exemplary embodiment in the fifth aspect of the present invention.
Figure 21B:
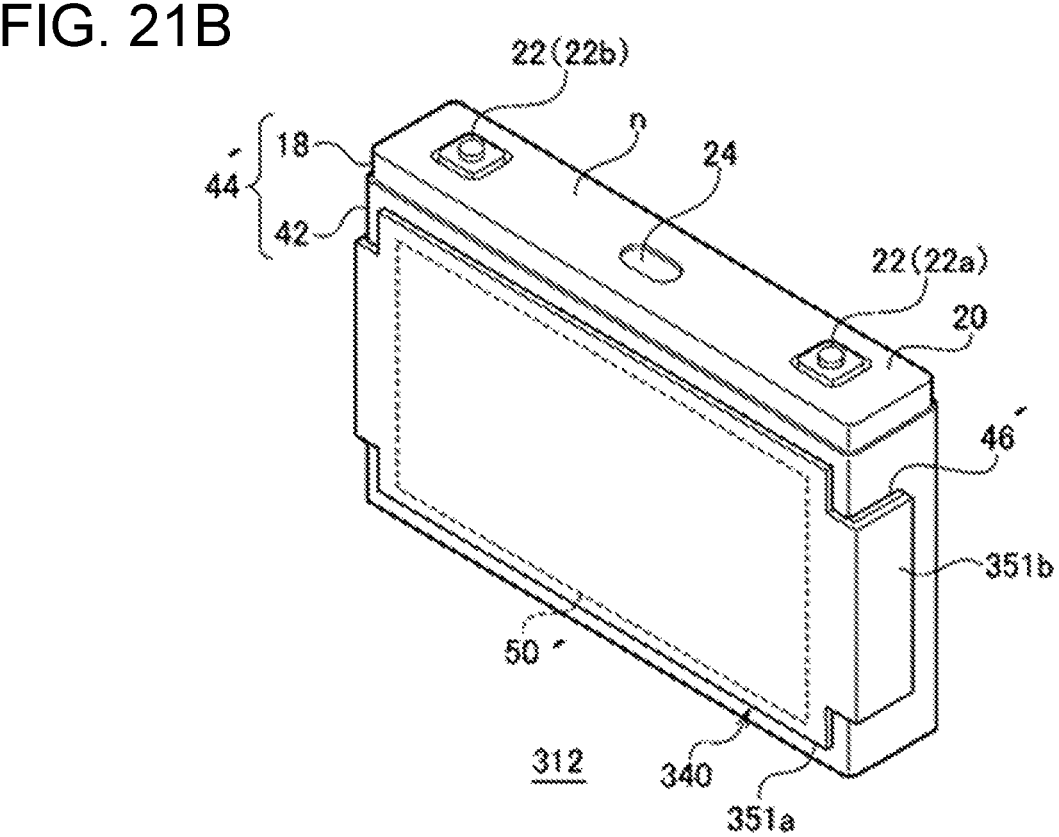
FIG. 21B is a schematic perspective view illustrating a structure of a battery according to the third exemplary embodiment.

In the fifth aspect of the present invention, a battery module according to a third exemplary embodiment shares a configuration with the battery module of the first exemplary embodiment except for a dissimilarity in a shape of a heat transfer suppression member. The following description of the battery module according to the present exemplary embodiment is primarily given on differences between the first and third exemplary embodiments, and redundant descriptions of shared elements are omitted or simplified. FIG. 21A is a front view schematically illustrating a heat transfer suppression member included in a battery according to the third exemplary embodiment. FIG. 21B is a schematic perspective view illustrating a structure of a battery according to the third exemplary embodiment.

Battery 312 according to the present exemplary embodiment includes heat transfer suppression member 340. Heat transfer suppression member 340 has heat insulating material 50' and laminate film 351. Laminate film 351 has body 351a and a pair of ribs 351b. Body 351a is a part that wraps up heat insulating material 50' and corresponds to laminate film 51 according to the first exemplary embodiment. Body 351a coats one main surface of housing 44'.

The pair of ribs 351b protrudes from both side edges of body 351a. When heat transfer suppression member 340 is attached to housing 44', ribs 351b are bent with respect to body 351a and coat both side surfaces of housing 44'. Adhesive layer 46' is interposed between ribs 351b and the side surfaces of housing 44'. Accordingly, ribs 351b are attached to the side surfaces of housing 44'. This causes heat transfer suppression member 340 to be fixed to housing 44'.

With the configuration in which heat transfer suppression member 340 is fixed to the side surfaces of housing 44', adhesive layer 46' can be evacuated from a region sandwiched between housings 44' of adjacent batteries 312. The region sandwiched between two housings 44' tends to have a higher temperature than a region on a side of battery 312. Therefore, by disposing adhesive layer 46' on a side surface of housing 44', it is possible to suppress alteration in property of adhesive layer 46' and bleed-out of an adhesive component.

The present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of the combined or modified exemplary embodiments.

Battery 12 may be configured not to have insulating film 42. In this case, housing 44' is constituted only by exterior can 18, and adhesive layer 46' is stacked on a main surface of exterior can 18. A shape of battery 12 is not limited in particular and can be, for example, a cylindrical shape. Further, a number of batteries 12 included in a battery assembly is not particularly limited.

Any desired combinations of the above-described components and converted expressions of the present invention in methods, devices, systems, and other similar entities are still effective as aspects of the present invention.

The invention claimed is:
1. A battery module comprising:
a plurality of batteries that are stacked;
a separator that has a first face and a second face opposite to the first face and is disposed between adjacent two batteries of the plurality of batteries so as to insulate the adjacent two batteries from each other; and
a heat transfer suppression member disposed between one of the adjacent two batteries and the first face of the separator,
wherein no heat transfer suppression member is disposed between another of the adjacent two batteries and the second face of the separator.
2. The battery module according to claim 1, wherein the separator has a protrusion that protrudes toward a heat transfer suppression member side so as to support the heat transfer suppression member.
3. The battery module according to claim 1, wherein
each of the plurality of batteries has an exterior can that has a rectangular parallelepiped shape having an opening and a sealing body that closes the opening,
the separator has a plane that extends along opposing surfaces of the adjacent two batteries, and
the heat transfer suppression member is fixed to the plane.
4. The battery module according to claim 3, wherein
the separator has a protrusion that protrudes from the plane toward a heat transfer suppression member side so as to support the heat transfer suppression member,
the battery module further comprises a restraint member that sandwiches the plurality of batteries in a direction in which the protrusion protrudes, and a position of the protrusion relative to the sealing body of the battery located in a position toward which the protrusion protrudes is deviated in a direction in which the plane extends.

5. The battery module according to claim 1, wherein the separator has a recess in which the heat transfer suppression member is stored.

6. The battery module according to claim 1, wherein the heat transfer suppression member has higher heat resistance than the separator.

7. The battery module according to claim 1, wherein the heat transfer suppression member has a porous material having a void structure and a fiber sheet holding the porous material.

8. The battery module according to claim 7, wherein the fiber sheet contains a fiber that has a higher melting point than the separator.

9. The battery module according to claim 7, wherein the porous material is made of a substance that has a higher melting point than the separator.

10. The battery module according to claim 7, wherein the heat transfer suppression member further has a laminate film that wraps up the porous material and the fiber sheet.

11. A battery module comprising:
a plurality of batteries that are stacked; and
a separator that is disposed between adjacent two batteries of the plurality of batteries so as to insulate the adjacent two batteries from each other,
wherein the separator includes an integrally molded product obtained by integrally molding a base member that is made of a resin and includes a first part extending between the adjacent two batteries and a heat transfer suppression member disposed in the first part.

12. The battery module according to claim 11, wherein the separator further has a laminate film that coats a surface of the heat transfer suppression member.

13. A battery module comprising:
a plurality of batteries that are stacked; and
a separator that is disposed between adjacent two batteries of the plurality of batteries so as to insulate the adjacent two batteries from each other; and
a heat transfer suppression member that is disposed between the adjacent two batteries,
wherein the separator has, in a region that overlaps the batteries when viewed from a direction in which the batteries are stacked, a through-hole that passes through the separator in the direction in which the batteries are stacked, and
at least part of the heat transfer suppression member is stored in the through-hole.

14. The battery module according to claim 13, wherein
the heat transfer suppression member has a heat insulating material and a laminate film that wraps up the heat insulating material, and
the laminate film has a flange part that overlaps an edge of the through-hole.

15. The battery module according to claim 14, wherein
the separator has a first part that extends between the adjacent two batteries and a second part that extends from an end of the first part toward a battery side,
the through-hole is disposed in the first part,
at least part of the heat insulating material is disposed in the through-hole, and
the flange part overlaps an edge of the through-hole.

16. The battery module according to claim 15, wherein a front end of the flange part is in contact with the second part.

17. The battery module according to claim 13, wherein the heat transfer suppression member has higher heat resistance than the separator.

18. The battery module according 1, wherein:
each of a plurality of batteries includes an exterior can,
an outer surface of the exterior can is coated by an insulating film having a first surface and a second surface opposite to the first surface,
the first surface of the insulating film faces the exterior can, and
the second surface of the insulating film faces the heat transfer suppression member.

* * * * *